June 4, 1940.  J. M. PESTARINI  2,203,544
POWER SYSTEM
Filed Sept. 21, 1938    3 Sheets-Sheet 1

Inventor:
Joseph M. Pestarini,
by Harry E. Dunham
His Attorney.

June 4, 1940.  J. M. PESTARINI  2,203,544

POWER SYSTEM

Filed Sept. 21, 1938   3 Sheets-Sheet 2

Inventor:
Joseph M. Pestarini,
by Harry E. Dunham
His Attorney.

Inventor:
Joseph M. Pestarini,
by Harry E. Dunham
His Attorney.

Patented June 4, 1940

2,203,544

UNITED STATES PATENT OFFICE 2,203,544

POWER SYSTEM

Joseph M. Pestarini, Turin, Italy

Application September 21, 1938, Serial No. 231,009

19 Claims. (Cl. 290—17)

My invention relates to power systems wherein a prime mover is arranged to drive a generator supplying current to an electrical load.

Electrical power systems are often used in transportation for driving self-propelled vehicles or ships wherein an engine drives a generator which is arranged to supply power to the driving motors. In such a system, the engine generally is a substantially constant torque and constant speed prime mover, and it is desirable that the main electric generator driven by the prime mover should develop substantially constant power over the major portion of the operating range when the engine is operating at the maximum efficiency speed of the prime mover, and it also is desirable that the generator should have such a characteristic that the load current and voltage does not exceed a predetermined maximum limiting value.

An object of my invention is to provide a generator having an excitation system arranged to provide a substantially constant power characteristic over the major portion of the normal operating range thereof, and a current and voltage limiting characteristic for maintaining the current and voltage within safe limiting values.

Another object of my invention is to provide a power system wherein a prime mover is arranged to drive a generator for supplying substantially constant power to an electrical load over the major portion of the normal operating range, and arranged to limit the current and voltage of the generator and thereby limit the power developed to safe operating values.

Further objects and advantages of my invention will become apparent and my invention will be better understood from the following description referring to the accompanying drawings, and the features of novelty which characterize my invention will be pointed out with particularity in the claims appended to and forming part of this specification.

Figure 10:
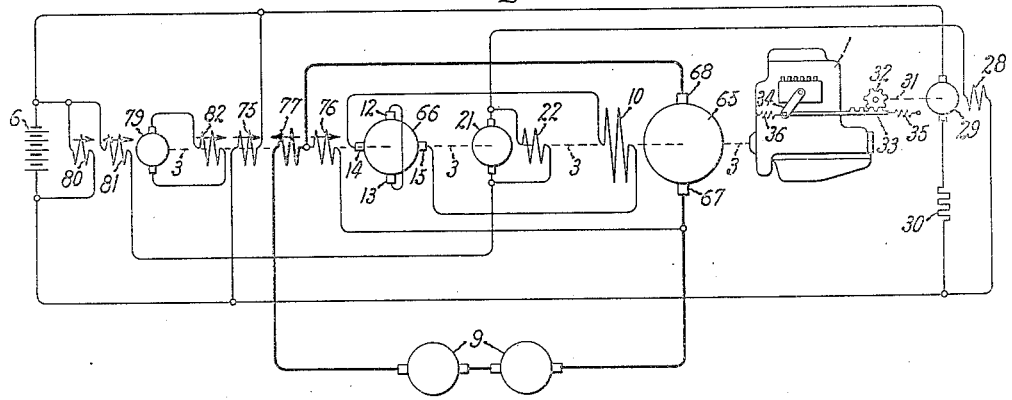
Figure 11:
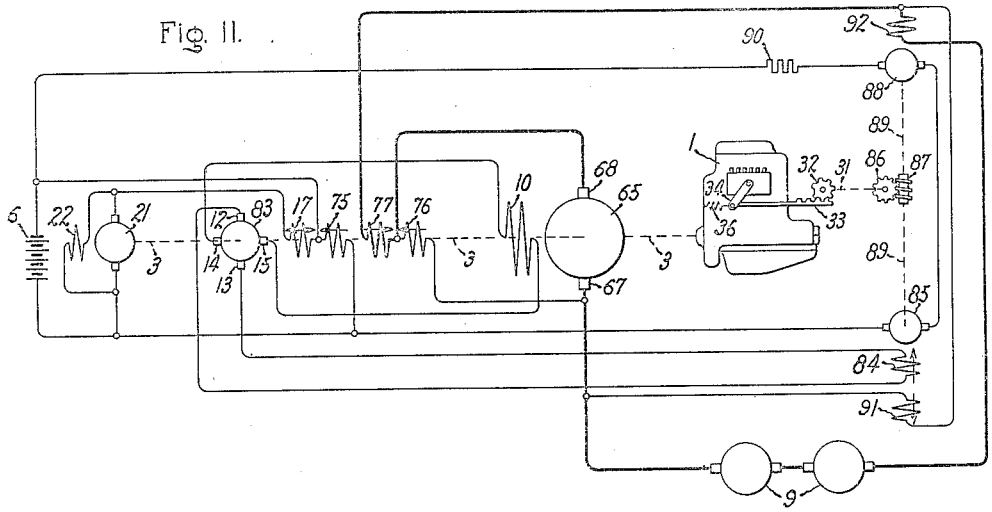
Figure 12:
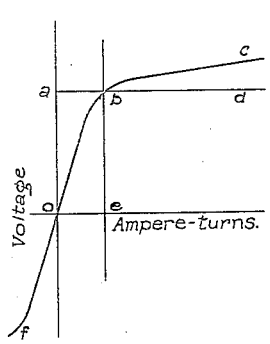
Figure 13:
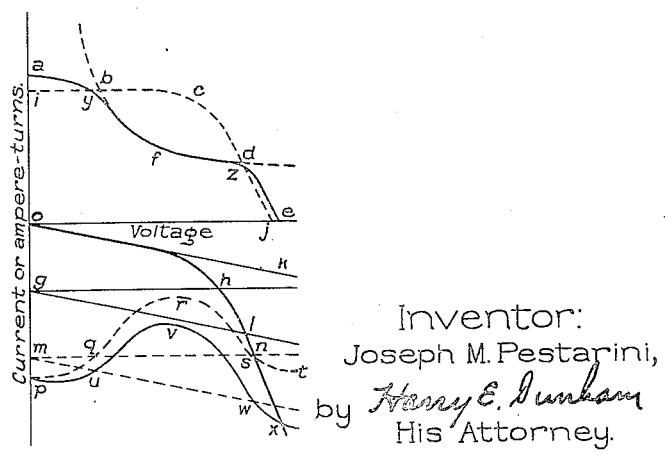
Figure 1:
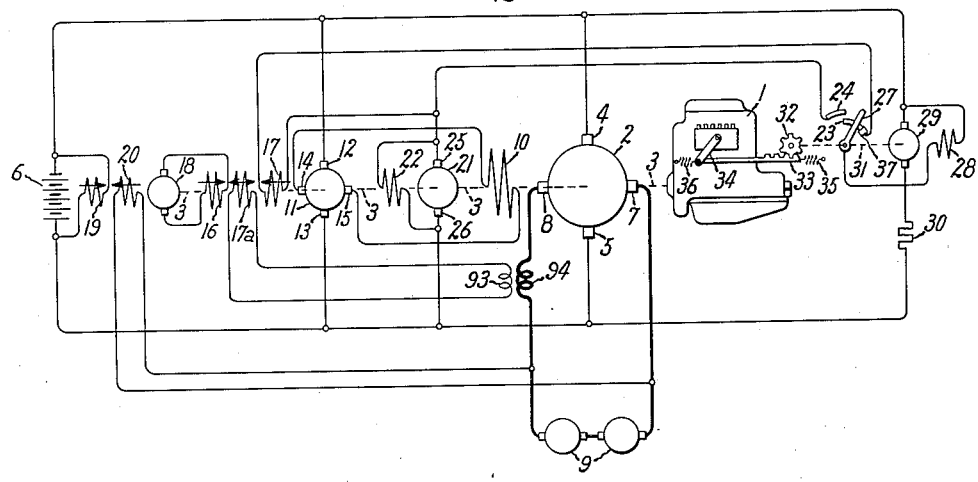
Figure 2:
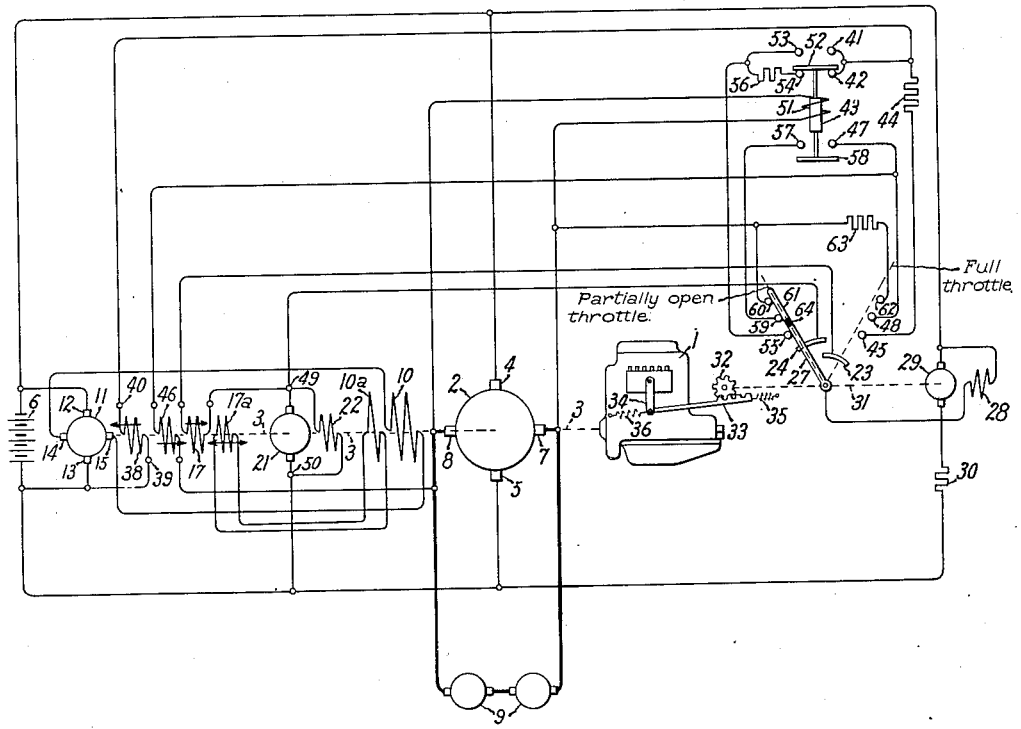
Figure 3:
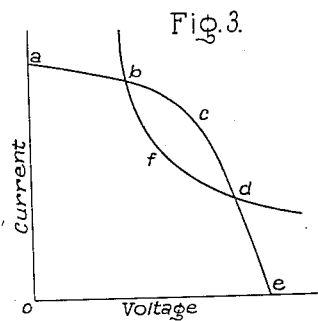
Figure 4:
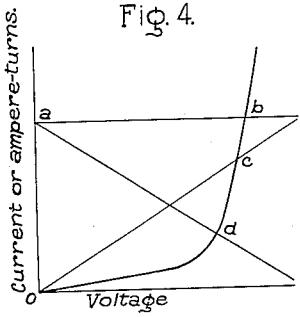
Figure 5:
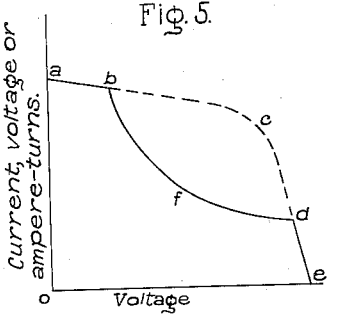
Figure 6:
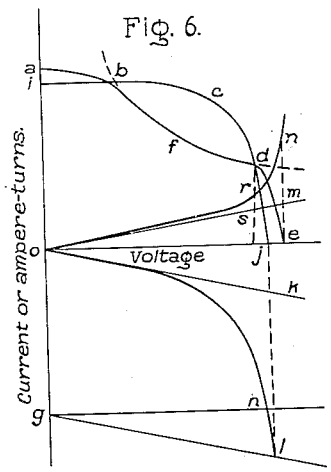
Figure 7:
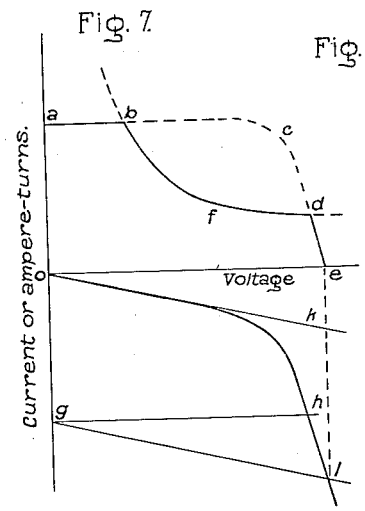
Figure 8:
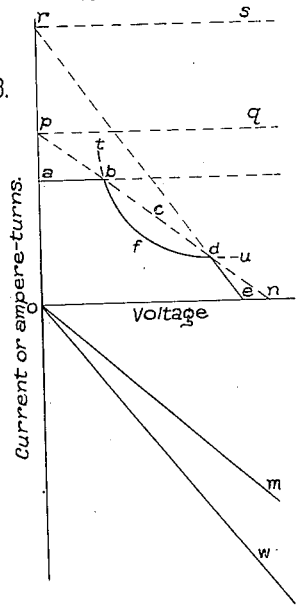
Figure 9:
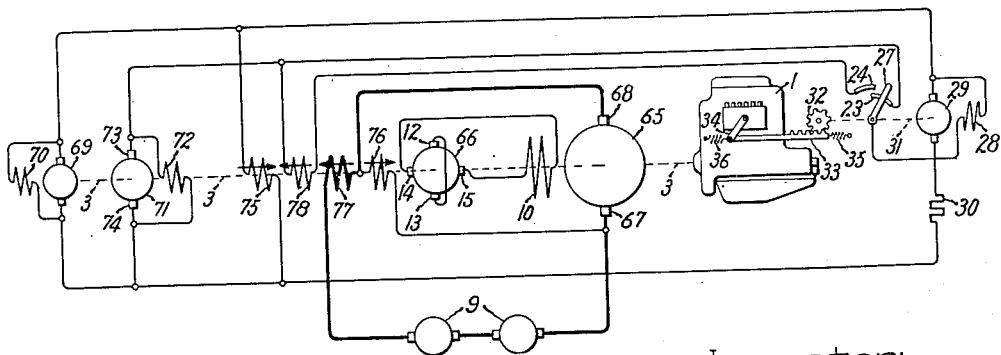

In the drawings, Fig. 1 schematically illustrates a power system wherein a prime mover is arranged to drive a generator having a substantially constant power output characteristic over the major portion of its operating range and a current-limiting and voltage-limiting characteristic for limiting the voltage and current of the system to safe operating values; Fig. 2 represents a modification of the system shown in Fig. 1; Fig. 3 represents the general characteristics of a system such as that shown in Figs. 1 and 2; Figs. 4 and 5 represent the operating characteristics of the system shown in Fig. 1; Fig. 6 represents the operating characteristics of various elements of the power system shown in Fig. 11; Fig. 7 represents the operating characteristics of different elements of the power system shown in Fig. 9; Fig. 8 represents operating characteristics of the power system shown in Fig. 2; Fig. 9 is another and the preferred embodiment of my invention and represents a power system somewhat similar to Fig. 1; Fig. 10 represents a further modification of my invention somewhat similar to the system arrangement shown in Fig. 9; Fig. 11 is another modification of my improved power system, and is somewhat similar to the arrangement shown in Fig. 10; Fig. 12 represents the operating characteristics of an auxiliary exciter in the power system shown in Fig. 10; and Fig. 13 represents the operating characteriscs of various elements of the power system shown in Fig. 10.

Referring to the drawings, I have shown in Fig. 1 a substantially constant torque prime mover 1, such as a Diesel engine, arranged to drive a main generator 2 of the metadyne or armature reaction excitation type through a shaft 3. Essentially, a dynamo-electric machine of the metadyne type is a direct-current dynamo-electric machine having a rotor or armature provided with windings and a commutator of the conventional direct-current dynamo-electric machine type, and a stationary member providing a path of low magnetic reluctance to the magnetic fluxes set up by the armature currents. The commutator of a bipolar machine usually is provided with two brush sets electrically displaced from each other for providing a primary circuit and a secondary circuit through the metadyne rotatable member or armature. The brush set which is arranged to provide the primary armature circuit usually is arranged to maintain the electrical potential across the primary circuit substantially constant and may be short circuited or connected across a substantially constant potential source of electrical power supply and the other brush set carries a direct-current of substantially constant magnitude. The stationary member of the metadyne also may be provided with various field exciting windings arranged to provide the metadyne with special characteristics and to insure the stability of the machine.

The main metadyne generator 2 is provided with an armature and a commutator similar to that of a conventional direct-current dynamo-electric machine. Two sets of brushes are arranged about the commutator, and one of these sets of brushes 4 and 5 is connected across an electric battery 6 which provides a substantially constant potential source of electrical power supply, and these brushes 4 and 5 provide a primary circuit through the armature 2 and, therefore, form the primary brush set. Another set of brushes 7 and 8 is electrically and angularly displaced about the commutator from the primary brushes 4 and 5, and is connected to an electrical load comprising motors 9 and provides a secondary circuit through the generator armature 2 and, therefore, forms the secondary brush set.

The main metadyne generator is provided with a stator arranged to provide a path of low magnetic reluctance to the fluxes set up by the armature currents, and a field exciting winding 10 is arranged to magnetically excite the main generator and control its operating characteristics. This field exciting winding 10 generally is called a variator field exciting winding, as it varies or controls the characteristics of the main generator. The variations in the energization of the variator field exciting winding are obtained by controlling the excitation of an auxiliary metadyne exciter 11 arranged to energize this variator winding. The excitation of the auxiliary metadyne 11 is controlled automatically and inherently in such a manner as to maintain substantially constant power output by the main metadyne generator over the major portion of its operating range and to provide a drooping voltage-current characteristic to the main generator over a portion of its operating range for limiting the maximum voltage and current to safe operating values. The metadyne exciter 11 is provided with an armature and commutator which are similar to that of a conventional direct-current dynamo-electric machine armature and commutator, and is driven in a predetermined speed relation to the speed of the prime mover 1 through the shaft 3. Two sets of brushes are arranged about the auxiliary metadyne commutator, and one of these sets of brushes 12 and 13 is connected across the electric battery 6 and provides a primary circuit through the armature 11, and forms the primary brush set, and another set of brushes 14 and 15 is electrically displaced from the primary brushes 12 and 13 and is connected to the main generator field exciting winding 10. These brushes 14 and 15 provide a secondary circuit through the armature 11 and form the secondary brush set of the auxiliary metadyne exciter. A stationary member also is arranged to provide a path of low magnetic reluctance to the fluxes set up by the auxiliary metadyne armature currents, and is provided with two field exciting windings 16 and 17 arranged to control the operating characteristics of the auxiliary metadyne dynamo-electric machine 11. The field exciting winding 16 is energized by an auxiliary dynamo-electric machine 18, which is driven in a predetermined speed relation to the speed of the other rotating machines and the prime mover by the shaft 3. The auxiliary dynamo-electric machine 18 is provided with a field exciting winding 19 connected across the battery 6 in order to provide it with a substantially constant component of excitation. Another field exciting winding 20 is provided for the auxiliary exciter 18 and is connected across the secondary brushes 7 and 8 of the main generator 2 so as to provide a component of excitation which varies in accordance with an electrical characteristic of the main generator; namely, the secondary voltage thereof. The field exciting winding 20 is arranged so that the component of excitation which it provides is opposed to the excitation provided by the field exciting winding 19, as indicated by the arrows in Fig. 1. This arrangement of field exciting windings provides the auxiliary exciter 18 with a voltage characteristic which is substantially constant for low main generator secondary voltages and which falls off very rapidly at high main generator secondary voltages, thus providing the auxiliary exciter 18 with the type of characteristic which is generally desirable for limiting the voltage and current of the machine. Fig. 3 shows the general characteristics of a system illustrative of the general case wherein the dynamo-electric machine is provided with excitation, giving it a drooping voltage-current characteristic $a$—$b$—$c$—$d$—$e$ which limits the current and voltage to safe operating values.

It is desirable that the main generator also should have a substantially constant power characteristic in order to obtain the maximum efficiency from the prime mover over the major portion of its operating range, and this constant power characteristic may be represented by a hyperbolic voltage-current characteristic, such as $b$—$f$—$d$ in Fig. 3. Therefore, it is generally desirable that the dynamo-electric machine be provided with an excitation over part of its operating range which will provide a voltage-current characteristic corresponding to the portions $a$—$b$ and $d$—$e$ of the curve $a$—$b$—$c$—$d$—$e$ and a main operating range voltage-current characteristic represented by the curve $b$—$f$—$d$.

The operation of the excitation system in Fig. 1 will be better understood by reference to Figs. 4 and 5. In Fig. 4, the curves represent the relation between the field exciting winding ampere-turns and voltages. The curve $a$—$b$ represents the relation of the constant ampere-turns provided by the field exciting winding 19 with respect to the terminal voltage of the auxiliary exciter 18 or the main generator secondary voltage. The curve $o$—$c$ represents the relation between the ampere-turns provided by the field exciting winding 20 and the main generator secondary terminal voltage. The curve $a$—$d$ represents the relation between the resultant ampere-turns of the field exciting windings 19 and 20 and the main generator terminal voltage across the brushes 7 and 8. The curve $o$—$d$—$c$—$b$ is a magnetization curve for the auxiliary exciter 18 and represents the relation between the field excitation and terminal volts of the auxiliary exciter 18. Fig. 5 illustrates the relation between the terminal volts of the auxiliary exciter 18 and the secondary voltage across the brushes 7 and 8 of the main metadyne generator 2, produced by the excitation represented by the curve $a$—$d$ and $o$—$d$—$c$—$b$ of Fig. 4. Since the load connected to the terminals of the auxiliary exciter 18 consists only of the field exciting winding 16, the curve $a$—$b$—$c$—$d$—$e$ in Fig. 5 also represents the relation of the current through this field exciting winding 16, and consequently, the ampere-turns of this field exciting winding with respect to the secondary terminal voltage of the main metadyne generator 2. The field exciting winding 16 is arranged along the secondary commutating zone of the auxiliary metadyne exciter 11 and is energized so as to produce an excitation in opposition to the secondary armature reaction of the auxiliary metadyne armature. This type of field exciting winding functions as a variator field exciting winding, as it varies the relation of the secondary current with respect to the primary armature voltage. The operation of a variator field exciting winding arranged on a metadyne dynamo-electric machine has been explained in my U. S. Patent No. 1,987,417, January 8, 1935. As explained in my above patent, any variation in the excitation provided by the variator field exciting winding 16 produces an inverse transient variation in the resultant excitation along the secondary commutating zone of the metadyne, which in turn produces a variation in the counter-electromotive force induced by the excitation along the secondary commutating zone between the primary brushes 12 and 13 of the metadyne corresponding to the resultant secondary excitation. This transient variation in the counter-electromotive force results in a variation of the primary armature current in the opposite sense to the variation of the counter-electromotive force and in the same sense as the excitation of the variator field exciting winding 16. This results in a variation in the secondary voltage between brushes 14 and 15, in the same sense as the variation in the excitation provided by the variator field exciting winding 16, and since this secondary voltage is impressed across the field exciting winding 10 of the main generator 2, the secondary current of the metadyne exciter 11, and consequently the current and excitation of the field exciting winding 10 vary in accordance with the excitation produced by the variator field exciting winding 16. Thus, it is clearly seen from the characteristic curve shown in Fig. 5, that the energization of the field exciting winding 10 will remain substantially constant for a given range of operating voltage of the main generator 2, and will fall off very rapidly beyond a predetermined secondary voltage of the main machine when controlled only by the auxiliary exciter 18. The field exciting winding 10 is arranged to produce excitation along the secondary commutating zone of the main metadyne generator 2, which is opposed to the secondary armature reaction of the main metadyne generator armature, and operates in the same manner as the field exciting winding 16 so that any variations in the excitation produced by the generator field exciting winding 10 produces a corresponding variation in the secondary current of the main metadyne generator 2.

As has been stated, the prime mover 1 is a substantially constant torque machine, and consequently for any given speed, it will develop a substantially constant power output. In order to utilize the prime mover at its maximum efficiency, it is desirable that the generator characteristic of the main metadyne generator 2 should vary as a hyperbolic relation between the secondary terminal voltage of the brushes 7 and 8 and the secondary load current. It is also desirable that the maximum power developed by the main metadyne generator 2 remain within the safe electrical operating limits of the generator 2, as well as within the safe mechanical operating limits of the prime mover 1. The limits of the power generated by the main generator may be controlled by the energization of the field exciting winding 10, so that beyond a predetermined secondary voltage of the main generator 2, the secondary load current will decrease very rapidly, and beyond a predetermined secondary load current of the main generator 2, the current will remain substantially constant, and the secondary terminal voltage will decrease very rapidly. In this manner, the voltage and current of the main metadyne generator may be very definitely limited by the excitation provided by the field exciting winding 10. Since the prime mover is a substantially constant torque source of power when it is regulated to operate at substantially constant speed, it will provide a substantially constant power for any given fuel supply, and there will be a particular operating speed at which it will operate at maximum efficiency. It, therefore, is desirable that the generator should have a substantially constant power characteristic over the greater part of its operating range, and this preferably should occur at the maximum efficiency speed of the prime mover 1.

In order to stabilize the operation of the system, I provide a field exciting winding 17a arranged to provide a component of magnetic excitation along the secondary commutating axis of the metadyne exciter 11 so as to vary the secondary current thereof, and therefore, to vary the energization of the field exciting winding 10 on the main generator 2. This stabilizing field exciting winding is connected across a secondary winding 93 of a transformer energized by a primary winding 94 connected to the secondary load circuit of the main generator. The excitation produced by this field exciting winding 17a may be in either direction, and the field exciting winding is arranged and connected to the transformer so that it will provide a component of excitation along the secondary axis of the metadyne exciter 11 which is opposed to any armature reaction or main component of magnetic excitation which would tend to produce alternating, transient, or oscillating currents in the secondary circuit thereof which might be reproduced or amplified in the secondary or load circuit of the main generator 2. In this manner, alternating, transient, or oscillating current will be effectively neutralized and suppressed and the stable operation of the system maintained.

Since the arrangement of the field exciting winding 16 will provide an energization of the field exciting winding 10, in accordance with the curve shown in Fig. 5, it is necessary that the excitation of the auxiliary metadyne exciter 11 be varied in order to obtain a hyperbolic characteristic relation between the secondary load current and the secondary voltage of the main metadyne generator 2. The field exciting winding 17 is connected across an auxiliary generator 21 and in series with the electric battery 6. The armature of the auxiliary generator 21 is driven by the shaft 3 in a predetermined speed relation to the speed of the other rotating machines and the prime mover, and is provided with a shunt field exciting winding 22 in order to obtain a more rapid and sensitive response to variation in the speed operating characteristic of the prime mover and rotating machines driven thereby. This machine is arranged to operate as an unsaturated generator so that small variations in speed will produce relatively large variations in its generated voltage, and it is so constructed and arranged that its terminal voltage will be equal to the voltage of the electric battery 6 when the speed of the prime mover 1 reaches the speed at which the prime mover operates at its maximum efficiency. In this manner, when the prime mover operates at its maximum efficiency speed, the voltage of the auxiliary generator 21 will be exactly equal to the voltage of the electric battery 6, and no current will flow through the field exciting winding 17, as this winding is energized in accordance with the difference in potential between the constant battery voltage and the variable voltage of the auxiliary generator 21 which depends upon the speed of the prime mover 1.

The operation of this type of excitation system is described in my U. S. Patent No. 2,038,384, April 21, 1936, and provides the auxiliary metadyne exciter 11 with a constant power characteristic represented by the curve b—f—d in Figs. 3 and 5.

Referring to these figures, it is desirable that the main metadyne generator 2 should have a characteristic a—b in order to limit the current to a safe operating value, that it should have a hyperbolic operating characteristic b—f—d so that it will utilize the prime mover at its maximum efficiency over the major portion of its operating range, and that it should have a voltage limiting characteristic d—e in order to limit the voltage of the generator to a safe operating range. As has been explained, the generator may be provided with a characteristic a—b and d—e by the variator field exciting winding 16, as determined by the excitation of the field exciting winding 16. It is, therefore, desirable that the field exciting winding 17 of the auxiliary metadyne exciter 11 should be inoperative during that portion of the operating range of the main generator 2 which is determined by the current or voltage limiting generator characteristics a—b and d—e respectively, and that the excitation provided by the field exciting winding 19 should correspond to the hyperbolic characteristic b—f—d for all values intermediate the operating points b and d of the operating characteristics of the main generator 2. In order to obtain the hyperbolic characteristic b—f—d, the field exciting winding 17 is arranged to produce an excitation which is opposed to the excitation provided by the field exciting winding 16, and of such magnitude that the secondary voltage between the brushes 14 and 15 of the auxiliary exciter metadyne 11 will have a hyperbolic relation to the secondary voltage of the main metadyne generator across brushes 7 and 8. As explained with respect to Fig. 5, the curve representing the relation between the energization of the variator field exciting winding and the secondary voltage of the metadyne, corresponds to the curve representing the relation between the secondary current of the metadyne and the secondary terminal voltage thereof. Therefore, it may be said that it is desirable that the energization of the variator field exciting winding 16 should correspond to the curve a—b—f—d—e shown in Fig. 5.

Since the variator field exciting winding 16 will provide the main metadyne generator 2 with the characteristic a—b and d—e without the use of the field exciting winding 17, a device is arranged to deenergize the field exciting winding 17 when the secondary current and voltage of the main metadyne generator 2 bear the relations represented by the points b and d in Fig. 5. This device includes a switch provided with a contact 23, connected to one terminal of the field exciting winding 17, and another contact 24 connected to the other terminal of the field exciting winding 17 and to a brush 25 of the auxiliary generator 21 to which the field exciting winding 17 is connected. An oscillatable sliding contactor 27 is arranged to complete an electrical circuit through the contact 23, and a field exciting winding 28 of a dynamo-electric relay 29 to the battery 6. The relay 29 includes a rotatable member which is connected across the battery 6 through a resistance 30 arranged to limit the current through the rotatable member. Since the voltage of the auxiliary generator 21 may be higher, lower, or equal to the voltage of the electric battery 6, the current which flows through the field exciting winding 28 may provide an excitation in one direction or another, or no excitation at all, depending upon the relative direction and magnitude of the current flowing between the auxiliary generator 21 and the electric battery 6. The rotatable member 29 is connected by a shaft 31 to the arcuately oscillatable contactor 27, and the direction and magnitude of the torque exerted by the rotatable member 29 is dependent upon the excitation provided by the field exciting winding 28. It is obvious that when the speed of the prime mover is such that the voltage of the auxiliary generator 21 exactly equals the voltage of the electric battery 6, no current will flow therebetween, and the field exciting winding 28 will be deenergized, so that no torque will be exerted by the rotatable member 29. This is the condition which is obtained at the points b and d of the characteristic curve shown in Fig. 5, for at these points of the operating characteristic, the variator field exciting winding 16 provides the auxiliary metadyne exciter 11 with an excitation such that the excitation of the variator field exciting winding 16 is such that the relation of the secondary voltage and current of the main metadyne generator is that represented by the points b and d. For any points on the operating characteristic intermediate the points b and d, the field exciting winding 16 will tend to provide an excitation to the field exciting winding 16 which would give the main metadyne generator a voltage-current characteristic similar to that shown by the dotted curve b—c—d. However, for any operating point intermediate b and d, along the curve c—d, the generator 2 will tend to overload the prime mover and tend to reduce the speed of the prime mover. Such reduction in speed will cause a reduction in the voltage generated by the auxiliary generator 21 so that current will tend to flow from the battery 6 to the dynamo-electric machine 21, and will tend to drive this machine as a motor. The field exciting winding 28 of the relay 29 is arranged so that such a direction of current flow causes the relay 29 to exert a torque in a clockwise direction, and completes a circuit between the contactor 27 and contact 23, so that current flows through the field exciting winding 17 which produces an excitation in opposition to the excitation produced by the field exciting winding 16. This reduces the secondary voltage of the auxiliary metadyne exciter 11, and consequently, reduces the energization of the variator field exciting winding 16. This, in turn, reduces the excitation produced by the field exciting winding 16, producing a corresponding reduction in the secondary voltage between the brushes 7 and 8 and the secondary current of the main metadyne generator. This reduction in secondary voltage and current of the main metadyne generator is represented by the difference between the ordinates and abscissas, respectively, of the curve b—c—d and the curve b—f—d in Fig. 5. In this manner, the operating characteristic between the points b and d is made to follow the hyperbolic curve b—f—d, as any variation from the constant power output curve b—f—d will tend to produce a variation in the excitation of the field exciting winding 17, so as to maintain the power developed by the main metadyne generator 2 substantially constant. When the operating characteristic of the main metadyne generator 2 becomes such that either the voltage or the current reaches the point $d$ or $b$, respectively, the current through the field exciting windings 17 and 29 will be reduced to zero. Under this condition, the field exciting winding 17 has no effect on the main generator characteristic, and the relay 29 is substantially torqueless.

When the operating characteristic of the main metadyne generator 2 is such that it follows the relation represented by the curves $a-b$ or $d-e$, the power generated by the main generator 2 is less than the power developed by the prime mover 1, and the speed of the prime mover, and the rotating machines, will tend to increase. Therefore, it is desirable that along these portions of the operating characteristic of the main metadyne generator 2, that the fuel intake of the prime mover 1 should be less than that required for its operation at its maximum efficiency speed, so that the power developed by the prime mover will be limited to that required by the generator characteristic. In order to vary the fuel intake of the prime mover to obtain this decrease in power developed, a throttle controlling mechanism is provided which includes a gear wheel 32 mounted on the shaft 31 and arranged to move a gear rack 33 connected to a throttle control lever 34. Springs 35 and 36 are arranged to bias the throttle gear rack 33 to a position which provides the prime mover 1 with a fuel supply corresponding to the maximum efficiency speed position. Whenever relay 29 becomes substantially torqueless, the biasing springs 35 and 36 act upon the gear rack 33 so as to provide the prime mover 1 with a fuel supply, so that it will operate at its maximum efficiency speed, and since the gear wheel 32 is connected through the shaft 31 to the contactor 27, it will cause the contactor 27 to oscillate in such a direction as to complete a circuit through the contact 23 to energize the field exciting winding 17, as described above. A stop 37 is arranged on the contact 23 so as to limit the movement of the contactor 27 when the torque of the relay 29 increases in the direction tending to open the throttle of the prime mover 1 beyond its maximum efficiency fuel intake position. For any operating condition represented by the curve $a-b$, and $d-e$, the speed of the prime mover will tend to be higher than the maximum efficiency operating speed, so that the voltage of the auxiliary generator 21 will be higher than the voltage of the electric battery 6, and a current will tend to flow from the auxiliary generator 21 through the field exciting winding 28 to the battery 6. This current flow will excite the field exciting winding 28 in such a direction that the torque developed by the relay 29 will be in a counter-clockwise direction in Fig. 1, and will act against the biasing force of the spring 36, thereby tending to close the prime mover throttle, and consequently, decrease the speed of the prime mover 1, and also will tend to oscillate the contactor 27 in a counter-clockwise direction as shown. Such a movement of the contactor 27 will open the circuit between the contactor 27 and the contact 23, thereby opening the circuit of the field exciting winding 17 so that it becomes inoperative, and also completes a circuit between the contactor 27 and the contact 24. In this manner, the armature of the auxiliary generator 21 remains connected in series with the electric battery 6, and the field exciting winding 28 remains energized in the same direction as before. Thus, for all operating conditions of the main metadyne generator 2 represented by the curves $a-b$ and $d-e$, the field exciting winding 17 is inoperative, and the variator field exciting winding 10 is energized in accordance with the characteristic of the auxiliary metadyne exciter 11 as determined by the excitation provided by the variator field exciting winding 16. This provides an energization of the main metadyne variator field exciting winding 10 by the auxiliary metadyne 11 which produces the desired secondary voltage-current characteristic of the main metadyne, as represented by the curve $a-b-f-d-e$ in Fig. 5.

In Fig. 2 I have illustrated another embodiment of my invention which provides substantially the same characteristics as those of the system shown in Fig. 1, and the same reference numerals have been applied to corresponding elements in both figures. The characteristics of the system shown in this figure are illustrated in Fig. 8.

In this system, a substantially constant torque prime mover 1, such as a Diesel engine, is arranged to drive a main generator 2 of the metadyne or armature reaction excitation type through a shaft 3. The main generator is provided with a set of primary brushes 4 and 5 connected across an electric battery 6, which is a substantially constant potential source of electrical power supply. A set of secondary brushes 7 and 8 are also associated with the armature 2 of the main generator, and are electrically displaced from the primary brushes 4 and 5, and supply an electrical load comprising motors 9 connected thereacross. The main generator 2 also is provided with a stationary member arranged to provide a path of low magnetic reluctance to the fluxes of the machine, and a field exciting winding 10 is arranged to excite magnetically the main generator and control its operating characteristics. This field exciting winding 10 is arranged to provide a component of magnetic excitation to the main generator in opposition to the secondary armature reaction set up by the secondary current flowing through the armature between the secondary brushes 7 and 8. The operation of this type of variator field exciting winding is clearly explained in my U. S. Patent 1,987,417, January 8, 1935.

In order to stabilize the operation of the system shown in this figure, I provide a stabilizing field exciting winding 17a arranged to provide a component of magnetic excitation along the secondary commutating axis of the metadyne exciter 11 so as to vary the secondary current thereof, and therefore, to vary the energization of the field exciting winding 10 of the main generator. This stabilizing field exciting winding 17a is connected across a stabilizing field exciting winding 10a arranged along the secondary commutating axis of the main generator 2. The excitation provided by these stabilizing field exciting windings may be in either direction, and the field exciting windings are arranged and connected so that the excitation produced along the secondary commutating axis of the metadyne exciter by the field exciting winding 17a is opposed to any component of excitation produced by any transient, alternating, or oscillating currents. Any change in the generator main field will induce a voltage in the main generator stabilizing field exciting winding 10a so that the current flowing in this field exciting winding will be substantially 180 electrical degrees out of phase with the current producing the main generator excitation variation along its secondary axis. This induced current in the main generator stabilizing field exciting winding 10a will flow through the metadyne exciter stabilizing field exciting winding 17a in a direction so as to produce a component of excitation which will provide a variation in the excitation produced by the field exciting winding 10 opposed to the variations of the main excitation along the secondary commutating axis of the main generator produced by the alternating, oscillating, or transient currents. In this manner, such variations are effectively neutralized or suppressed, and the stability of the system will be maintained. In this arrangement, currents induced in the exciter stabilizing field exciting winding 17a also are fed back to the main generator field exciting winding 10a, and thus tend to neutralize transient, alternating, or oscillating variations in the secondary current of either of the two machines.

In the present arrangement, the energization of the variator field exciting winding 10 is provided by an auxiliary dynamo-electric machine 11, also of the metadyne or armature reaction excitation type. This auxiliary metadyne exciter 11 is provided with a primary set of brushes 12 and 13 which are connected across the constant potential electric battery 6, and a secondary set of brushes 14 and 15 electrically displaced from the primary brush set and electrically connected across the terminals of the variator field exciting winding 10. As has been explained with respect to Fig. 1, the voltage-current characteristic of the main metadyne generator 2 will be controlled by the excitation of the variator field exciting winding 10, so that its characteristic will be substantially the same as the secondary voltage-current characteristic of the auxiliary metadyne dynamo-electric machine 11. The auxiliary metadyne exciter 11 is provided with a field exciting winding 38 arranged to provide a component of excitation along the secondary commutating zone of the machine in opposition to the secondary armature reaction produced by the secondary current flowing through the armature 11 between the brushes 15 and 14. This field exciting winding 38 is arranged to be connected across the electric battery 6 in series with different resistances, so as to provide different predetermined constant values of excitation to the machine for different predetermined ranges of operation of the main metadyne generator 2. One of the terminals 39 of the field exciting winding 38 is connected to a terminal of the battery 6, and the other terminal 40 of the field exciting winding 38 is connected to two electric contacts 41 and 42 of a voltage relay 43, and in series with a resistance 44 to a third electric contact 45 of an arcuately oscillatable relay 29. Another field exciting winding 46 is arranged to provide a component of magnetic excitation along the secondary commutating axis of the auxiliary metadyne exciter 11 in opposition to the excitation produced by the field exciting winding 38 and in accordance with an electrical characteristic of the main generator 2; namely, the secondary load voltage thereof. One of the terminals of this field exciting winding 46 is connected to the secondary brush 8 of the main generator, and the other terminal of this field exciting winding is connected to an electric contact 47 of the voltage-responsive relay 43, and to a second electric contact 48 of the oscillatable relay 29. A third field exciting winding 17 also is arranged to provide a component of magnetic excitation along the secondary commutating axis of the auxiliary metadyne exciter 11 in opposition to the excitation provided by the field exciting winding 38, and is energized by an auxiliary dynamo-electric machine 21 in series with the battery 6. The auxiliary dynamo-electric machine 21 is excited by a shunt field exciting winding 23 directly connected across its terminals, and is driven in a predetermined speed relation to the speed of the main generator 2 and the prime mover 1 by the shaft 3. This dynamo-electric machine is generally a regulator dynamo-electric machine, and the field exciting winding 17 a regulator field exciting winding. The excitation of the field exciting winding 17 by the regulator dynamo-electric machine 21 is arranged to maintain a substantially constant power output on the main generator 1 and the operation of such an excitation system is described in my U. S. Patent No. 2,038,384, April 21, 1936. One terminal of the field exciting winding 17 is connected to an electrical contact 23 of the relay 29, and the terminal 49 of the auxiliary dynamo-electric machine 21 is connected to another contact 24 of the relay 29, and the other terminal 50 of the dynamo-electric machine 21 is connected to a terminal of the battery 6.

The arrows on the field exciting windings 17, 38, and 46 indicate the relative directions of their excitation. As shown in this figure, an operating coil 51 of the voltage relay 43 is connected across the secondary brushes 7 and 8 of the main metadyne generator 2, and this voltage-responsive relay is constructed so that it is biased to the position shown in Fig. 2, until a predetermined voltage is applied to the operating coil 51, and for any voltage above this predetermined minimum voltage, the relay is actuated to its upper position. As shown, an upper contactor element 52 completes an electrical circuit between the contact 42 and a contact 54 when the relay is in its lower position, and is arranged to complete a circuit between the contact 41 and another contact 53 when the relay is actuated to its upper position. An electric contact 55 of the oscillatable relay 29 is connected directly to the contact 53 and in series with a resistance 56 to the contact 54. Furthermore, when the voltage-responsive relay is actuated to its upper position, as described above, an electrical contactor 58 is arranged to connect electrically the contact 47 to a contact 57, and the contacts 47 and 57 are disconnected when the relay 43 is in its lower position as shown in Fig. 2. The contact 57 is connected to an electrical contact 59 of the oscillatable relay 29, and is arranged to be electrically connected to another electric contact 60 of the relay 29 through a contactor 61 when the relay 29 is in the partially open throttle position shown in Fig. 2, and through the contact 60 to the secondary brush 7 of the main metadyne generator 2. Another contact 62 of the relay 29 also is connected to the secondary brush 7 in series with a resistance 63.

The operation of the oscillatable relay 29 is the same as that in Fig. 1, and as in that figure, the armature of the relay is connected across the battery 6 in series with a current limiting resistance 30. A shaft 31 mechanically connects the relay 29 to a contact arm which is composed of two electrically conductive elements 27 and 61 which are electrically insulated from each other by an insulating element 64. The direction and magnitude of the torque exerted by the rotatable member of the relay 29 is dependent upon the excitation provided by a field exciting winding 28. One terminal of this field exciting winding 28 is connected to the battery 6, and its other terminal is connected through the contactor 21 and the contact 24 to the terminal 49 of the auxiliary dynamo-electric machine 21, when the relay 29 is in the position shown in Fig. 2, and is connected through the contactor 27, the contact 23, and the field exciting winding 19 to the terminal 49 of the auxiliary dynamo-electric machine 21 when the relay 29 is in the full open throttle position shown by the dotted line in Fig. 2. In this manner, the field exciting winding 28 is connected across the battery 6 in series with the dynamo-electric machine 21 under all operating conditions. As stated with respect to Fig. 1, the auxiliary dynamo-electric machine 21 is a magnetically unsaturated dynamo-electric machine, the voltage of which varies directly with the operating speed of the machine, and is so constructed that when the speed thereof corresponds to the maximum efficiency speed of the prime mover 1, the generated voltage across the terminals 49 and 50 of the auxiliary dynamo-electric machine 21 is exactly equal and opposite to the terminal voltage of the battery 6. It is clear, therefore, that when the prime mover 1 operates at its maximum efficiency speed, there will be no current through the field exciting winding 28, as the voltage across this winding will be equal to the sum of the voltages across the terminal of the battery 6 and the dynamo-electric machine 21, and since each of these voltages will be exactly equal and opposite in direction, there will be no voltage across the field exciting winding 28. Springs 35 and 36 are arranged to bias the throttle gear rack 33 to a position which provides the prime mover 1 with a fuel supply corresponding to the maximum efficiency speed position. Thus whenever the relay 29 becomes torqueless, the springs 35 and 36 will act upon the throttle lever control gear rack 33 so as to urge the throttle to full open position. This actuation of the gear rack 33 will operate the gear wheel 32 which is secured to the end of the shaft 31, and will turn or oscillate the contact arm of the relay 29 to the full throttle position indicated by the dotted line in Fig. 2. This operating condition is indicated by the point b in Fig. 8.

The field exciting windings 17, 38, and 46 of the auxiliary metadyne exciter 11 each are arranged to provide a predetermined component of excitation along the secondary commutating axis of the metadyne 11 under predetermined operating conditions of the main generator 2. As has been explained above, the field exciting winding 17 is connected across the dynamo-electric machine 21 in series with the battery 6, and since the voltage of the dynamo-electric machine 21 is dependent upon the speed of the prime mover 1, the energization of the field exciting winding 17 varies as a function of the speed of the prime mover 1 and of the main generator 2. The field exciting winding 38 is arranged to provide different predetermined constant components of excitation along the secondary commutating axis of the auxiliary metadyne 11 for different predetermined operating conditions of the main generator 2. The constant components of excitation provided by this field exciting winding depend upon the resistance in series with the winding 38 across the battery 6, and this resistance is varied by the position of the oscillatable relay 29 and the position of the voltage-responsive relay 43. The field exciting winding 46 is arranged to provide a variable component of magnetic excitation along the secondary commutating axis of the metadyne exciter 11 in accordance with the load voltage across the secondary brushes 7 and 8 of the main metadyne 2, and is arranged to provide different predetermined ranges of excitation for different predetermined load conditions on the main generator 2. These different ranges of excitation are obtained by changing the resistance in series with the field exciting winding 46 in response to different predetermined operating conditions of the main generator 2.

The automatic and inherent operation of the system will be more readily understood by reference to Fig. 8 which represents the relation between the excitation of the main generator variator winding 10 and the secondary load voltage of the main generator, and, since the secondary current of the main generator varies in accordance with variations in the excitation of the field exciting winding 10, the current ordinates shown in this figure also represent the relation of the secondary current to the secondary voltage of the main generator 2. Since the energization of the field exciting winding 10 is the only load connected across the secondary brushes of the auxiliary metadyne exciter 11, its energization current is the same as the secondary current flowing through the secondary armature circuit of the auxiliary metadyne exciter. This secondary current of the auxiliary metadyne exciter 11 is controlled by the magnetic excitation along its secondary commutating axis, and this excitation is varied by the three field exciting windings 17, 38, and 46.

As has been stated with respect to Fig. 1, it is desirable that the secondary current and voltage of the main generator should not exceed a predetermined value. In Fig. 8 this maximum limiting safe secondary current is represented by the curve $a$—$b$, and at the operating point $b$ the voltage-current relation is such that it is desirable that the power output should remain substantially constant to a maximum safe limiting voltage $d$, when the voltage should decrease rapidly, as represented by the curve $d$—$e$. Thus, the curve $a$—$b$—$f$—$d$—$e$ represents a desirable generator characteristic for the main metadyne generator 2. In order to obtain such a characteristic, the relays 29 and 43 are arranged to vary the energization of the field exciting windings 17, 38, and 46 in response to predetermined operating conditions. The voltage responsive relay 43 is constructed so that when the secondary voltage of the main generator 2 is below the voltage $b$, the energization of the actuating coil 51 is not sufficient to actuate the voltage-responsive relay 43 to its upper position. Furthermore, at the operating point $b$, any tendency for the load current to increase results in a reversal in the direction of current in the regulating field exciting winding 17 indicated by the difference between the ordinates of the curves $t$—$b$ and $p$—$b$. This reversal of current in the field exciting winding 17 results in a reversal of current flow through the relay field 28. The field exciting winding 28 is arranged so that under this condition, torque will be exerted by the rotatable member 29 upon the contact arm of the relay in a counter-clockwise direction, and this will operate the gear 32 and gear rack 33 so as to close partially the prime mover throttle. In this position of the voltage relay 43 and of the relay 29, the contact 23 is disconnected from the contactor 27, so that the field exciting winding 17 is deenergized. Furthermore, with this position of the voltage relay 43, the contactor 58 opens a circuit between the contacts 47 and 57, and the contactor 61 on the operating arm of the relay 29 opens a circuit between the contact 48 and the contact 62 of this latter relay, so that the circuit of the field exciting winding 46 on the auxiliary metadyne 11 is open, and this winding also is deenergized. The terminal 39 of the field exciting winding 38 is connected to a terminal of the battery 6, and the terminal 40 of this field exciting winding is connected to the other terminal of the battery 6 in series with the resistance 56. This is the condition represented by the arrangement shown in Fig. 2, and the energizing current for the field exciting winding 38 flows from the battery 6 through the winding 38 to the contact 42 of the relay 43, through the contact 52 to the relay 54, through the resistance 56 to the contact 55, through the contactor 27 to the field exciting winding 28 of the relay 29, to the other terminal of the battery 6. The value of the resistance 56 is such that the resistance of this circuit will provide the field exciting winding 38 with an energization corresponding to the value oa in Fig. 8. Since the battery 6 is a substantially constant source of electrical power supply, the excitation of the auxiliary metadyne exciter 11 is substantially constant as provided by the field exciting winding 38, so that the secondary current flowing between the brushes 14 and 15 and through the field exciting winding 10 also is substantially constant. This energization of the field exciting winding 10 controls the secondary current flowing between the secondary brushes 7 and 8 of the main generator 2, and under these conditions, this secondary current is represented by the line ab in Fig. 8.

When operating along this portion a—b of the generator characteristic, an increase in load results in a temporary slight decrease in prime mover speed, thereby slightly decreasing the generated voltage of the regulating dynamo-electric machine 21. This results in a lowered counter-clockwise torque in the relay 29, and the springs 35 and 36 act to open the throttle of the prime mover and bring up its speed. This increase in speed increases the main generator voltage, thereby increasing the power delivered by the main generator to the load. When the secondary voltage $V_{7-8}$ of the main generator 2 reaches the value b, the energizing current flowing through the coil 51 of the voltage-responsive relay 42 is sufficient to actuate this relay to its upper position, thereby closing the circuit between the contacts 41 and 53, through the contactor 52 and the circuit between the contacts 47 and 57, through the contactor 58.

When operating at the point b, the speed of the prime mover is such that the voltage of the regulator dynamo-electric machine 21 will be exactly equal to the voltage of the battery 6, and no current will flow therebetween, so that the field exciting winding 28 of the relay 29 will be deenergized, and this relay will be substantially torqueless. The springs 35 and 36 are so arranged that under these conditions, the throttle lever gear rack 33 is moved to the full open position of the throttle. This actuation of the gear rack 33 will cause the gear 32 and the actuating arm of the relay 29 to turn or oscillate in a clockwise direction, so that the contactor 61 will close the circuit between the contacts 48 and 62, and the contactor 27 will close the circuit between the contacts 45 and 24 through the field exciting winding 28 and a terminal of the battery 6. This position of the relay 29 is indicated by the dotted line in Fig. 2 as the full throttle position. Under this condition, the terminal 39 of the field exciting winding 38 of the auxiliary metadyne exciter 11 is connected to a terminal of the battery 6, and the other terminal 40 of the field exciting winding 38 is connected to the other terminal of the battery 6 through the resistance 44. With this circuit, the energizing current of the field exciting winding 38 flows from the battery 6 through the resistance 44 to the contact 45, through the contactor 27 and the relay field exciting winding 28 to the other terminal of the battery 6. The value of the resistance 44 is such that the resistance of this energizing circuit for the field exciting winding 38 will provide this field exciting winding with an energization respresented by the line pq in Fig. 8. The resistance of this field energizing circuit is less than the resistance of the energizing circuit of the field exciting winding 38 when connected in series with the resistance 56, so that the excitation produced by the field exciting winding 38 under these conditions is greater than when the prime mover is operated with a partially open throttle at low main generator voltages. Furthermore, the field exciting winding 46 is connected across the secondary brushes 7 and 8 of the main generator 2, through the resistor 63, the contact 62, the contactor 61 and the contact 48. The resistance 63 is such that the energization of the field exciting winding 46 will vary with the secondary voltage across the brushes 7 and 8, as shown by the line o—m in Fig. 8. Since the excitation produced by the field exciting winding 46 is opposed to the excitation produced by the field exciting winding 38 the excitation along the secondary commutating axis of the metadyne exciter 11 produced by these two field exciting windings may be represented by the difference between the ordinates of the curves p—q and o—m. This difference is indicated by the line p—b—c—d—n. Furthermore, one terminal of the field exciting winding 17 is connected to the terminal 49 of the regulator dynamo-electric machine 21, and the other terminal of the field exciting winding 17 is connected to the contact 23 of the relay 29 through the contactor 27 and the field exciting winding 28 of the relay 29 to the battery 6 in series with the regulator dynamo-electric machine armature 21.

As has been stated, at the point b in Fig. 8, the voltage of the regulator dynamo-electric machine 21 will be exactly equal to the voltage of the battery 6, so that no current will flow in this circuit, and therefore, the field exciting winding 17 will not be energized at this point. If for any reason the load on the main generator 2 tends to increase, the prime mover 1 tends to operate at a slightly decreased speed, so that the voltage of the regulator dynamo-electric machine 21 will be decreased and current will flow from the battery 6 through the regulator dynamo-electric machine 21, and the field exciting winding 17, so as to energize this field exciting winding. The field exciting winding 17 is arranged to produce an excitation opposed to the excitation of the field exciting winding 38 under these conditions, so that the net excitation along the secondary commutating axis of the exciter metadyne 11 is reduced, and the secondary current of the metadyne 11, and consequently, the excitation produced by the field exciting winding 10 also is reduced, producing a corresponding reduction in the secondary current of the main generator 2. These conditions prevail whenever the prime mover operates with full open throttle, and the current-voltage characteristic of the main generator follows a constant power output characteristic, represented by the curve b—f—d in Fig. 8. The energization of the field exciting winding 17 under these conditions is equal to the difference between the ordinates represented by the curve b—f—d and the curve b—c—d, so that the net excitation of the exciter metadyne 11 along its secondary commutating axis, and consequently, the excitation produced by the main generator field exciting winding 10 follows a constant power hyperbolic characteristic represented by the curve b—f—d in Fig. 8. The hyperbolic constant power generator characteristic represented by the curve b—f—d is such that the speed of the prime mover 1 corresponds to its maximum efficiency speed, and any variation from this maximum efficiency speed results in a corresponding higher or lower generated voltage by the regulator dynamo-electric machine 21. This provides an increased or decreased excitation by the field exciting winding 17 and tends to maintain the secondary current of the metadyne exciter 11, and consequently, the excitation of the field exciting winding 10 and the secondary current of the main generator 2, at such a value that the power developed by the main generator 2, and consequently, the load on the prime mover 1 remains substantially constant, and the prme mover 1 continues to operate at its maximum efficiency speed at substantially constant torque.

In order to obtain the voltage limiting characteristic of the generator 2 for the arrangement shown in Fig. 2, a larger amount of differential excitation by the field exciting winding 46 opposed to the excitation of the field exciting winding 38 must be produced than during the constant power operating conditions. When operating at these high secondary voltages, the operating coil 51 of the voltage-responsive relay 53 is sufficiently energized to actuate the voltage-responsive relay 43 in its upper position. If the voltage and current of the main generator 2 reach the value indicated by the point d in Fig. 8, the speed of the auxiliary regulator dynamo-electric machine 11 is such that its voltage exactly equals the voltage of the battery 6 and substantially no current flows through the field exciting winding 17 of the metadyne exciter 11. Any tendency of the secondary voltage of the main generator 2 to increase beyond the point d produces a reversal of current in the regulating field exciting winding 17, indicated in Fig. 8 by the difference in the ordinates of the curves d—u and d—n. This reversal of current through the field exciting winding 17 results in a reversal of current through the relay field exciting winding 28, so that this relay exerts a torque in a counter-clockwise direction against the biasing force of the springs 35 and 36, tending to close the prime mover throttle. This causes the contractor arm of the relay 29 to turn in a counter-clockwise direction and completes the circuits between the relay contacts as shown in Fig. 2. With this position of the voltage-responsive relay 43 and the relay 29, the contact 23 of the relay 29 is disconnected, and the field exciting winding 17 is deenergized, so that it no longer effects the excitation of the metadyne exciter 11. Furthermore, the contactor 58 closes an electrical circuit between the contacts 47 and 57 so that the terminals of the field exciting winding 46 are connected through the contact 59, the contactor 61, and the contact 60, directly across the secondary brushes 7 and 8 of the main metadyne generator 2. In this manner, the excitation provided by the field exciting winding 46 is greater than the excitation provided by this same field exciting winding when connected in series with the resistance 63. The excitation produced by this field exciting winding under these conditions is represented by the line o—w in Fig. 8. Furthermore, the upper contactor 52 of the voltage-responsive relay 43 electrically connects the contacts 41 and 53, and the contactor 27 completes an electrical circuit between the contact 55 through the field exciting winding 28 of the relay 29, to the terminal 40 of the field exciting winding 38. In this manner, the field exciting winding 38 is connected across the battery 6 through the contact 41, the contactor 52, the contact 55, the contactor 27, and the field exciting winding 28. This energizing circuit of the field exciting winding 38 provides the highest excitation of its three circuit connections, and is indicated by the line r—s in Fig. 8. Since the excitation of the field exciting winding 46 is opposed to the excitation of the field exciting winding 38, the net or resultant excitation produced by these two field exciting windings is represented by the line r—d—e. Thus, for voltages of the main generator 2, higher than the value represented by the point d, the voltage-current characteristic of the main generator follows the characteristic indicated by the curve d—e, and the secondary voltage of the main generator is limited to a predetermined safe operating value, as desired.

Referring to Fig. 9, I have shown another embodiment of my invention, and the same reference numerals as those of Figs. 1 and 2 are applied to corresponding elements in this figure. In this arrangement, the main generator 65 is a conventional dynamo-electric machine excited by a field exciting winding 10 energized by a conformer metadyne exciter 66. The generator 65 is driven through a shaft 3 by a prime mover 1, such as a Diesel engine, having a substantially constant torque characteristic, and supplies power to an electrical load including driving motors 9 connected across the brushes 67 and 68 of the generator. The driving motors may be used in various arrangements, such as for land vehicle, marine, machine tool, or similar drives. It is desirable that the prime mover 1 should operate at its maximum efficiency speed, and since it is a substantially constant torque machine, it is desirable that the generator should have a substantially constant power output at the maximum efficiency speed of the prime mover over the greater part of its operating range. Furthermore, it is also desirable that the generator have a characteristic which limits its maximum voltage and maximum current to safe limiting operating values. In order to obtain such a characteristic, I provide the metadyne exciter 66 with special field exciting windings energized so as to provide automatically and inherently the main generator field exciting winding 10 with the desired characteristic. By operating the main generator 65 as a substantially unsaturated machine, its voltage-current characteristic bears a substantially direct linear relation to the excitation provided by its field exciting winding 10, and therefore, to the secondary voltage-current characteristic of the metadyne exciter 66.

The energization of the field exciting windings of the metadyne exciter 66 is provided by the main generator 65 in accordance with certain of its operating characteristics and by two auxiliary dynamo-electric machines. One of these auxiliary dynamo-electric machines 69 is driven in a predetermined speed relation to the generator 65 through the shaft 3 by the engine 1 and is provided with self-excitation by a field exciting winding 70. This field exciting winding is arranged so that the auxiliary generator 69 operates as a saturated machine over the greater part of its operating range, and provides a substantially constant voltage source of electrical power supply. The other auxiliary dynamo-electric machine 71 also is driven in a predetermined speed relation to the speed of the main generator 65 and the prime mover 1, through the shaft 3 by the prime mover. A field exciting winding 72 is arranged to excite the auxiliary generator 71, and is constructed so that it will operate as a magnetically unsaturated machine. This arrangement provides the auxiliary dynamo-electric machine 71 with a voltage characteristic which varies substantially as a direct linear function of the speed of the machine and varies over a wide range for small variations in speed. The field exciting winding 72 is connected across the brushes 73 and 74 of the auxiliary dynamo-electric machine 71, so that it still further insures relatively large voltage variations for small variations in the speed of the machine.

The metadyne exciter 66 is driven through the shaft 3 by the prime mover 1, and is of the conformer type, provided with a pair of primary brushes 13 and 12 which are short-circuited. The operation of this type of metadyne dynamo-electric machine has been explained in my United States Patents 2,038,384, April 21, 1936; 2,073,525, March 9, 1937; and 2,079,465, May 4, 1937. The field exciting winding 10 of the main generator 65 is connected across secondary brushes 14 and 15 of the metadyne exciter 66, and therefore, the energization of this field exciting winding has the same characteristics as the secondary characteristics of the conformer metadyne 66. The characteristics of the secondary circuit of the conformer metadyne exciter 66 are determined by field exciting windings arranged to provide four components of magnetic excitation along the secondary commutating axis of the machine. The energizations of these field exciting windings are represented by the curves in Fig. 7. A field exciting winding 75 is connected across the substantially constant potential saturated dynamo-electric machine 69, and provides a substantially constant component of magnetic excitation along the secondary commutating axis of the metadyne exciter in a given direction as represented by the arrow in Fig. 9. The curve $g$—$h$ in Fig. 7 represents the relation between the ampere-turns energization of this field exciting winding 75 and the secondary voltage across the secondary brushes 14 and 15 of the exciter metadyne 66, or the voltage of the main generator 65, as these voltages bear a substantially direct linear relationship to each other. Another field exciting winding 76 is arranged to provide a component of magnetic excitation along the secondary commutating axis of the metadyne exciter 66 in the same direction as the field exciting winding 75, as indicated by the arrow in Fig. 9, and is connected across the brushes 67 and 68 of the main generator. The component of energization provided by this winding varies as a linear function of the voltage of the main generator 65, and therefore, of the secondary voltage of the metadyne exciter 66. This relationship is represented by the curve $o$—$k$ in Fig. 7. The curve $g$—$l$ represents the relation of the sum of the energizations of the field exciting windings 75 and 76 to the secondary voltage of the exciter metadyne 66 or the voltage of the main generator 65. The curve $o$—$h$—$l$ represents the saturation curve of the metadyne exciter 66. Thus, if only the above field exciting windings are energized, the secondary voltage of the exciter and the voltage of the main generator will follow the curve $o$—$h$—$l$ and come to equilibrium at a value corresponding to the intersection point $l$ of the curves $o$—$h$—$l$ and $g$—$l$.

As has been stated, it is desirable that the main generator characteristic should have limiting voltage and limiting current values, and these operating conditions can be obtained by providing the generator with a drooping voltage-current characteristic. In order to obtain such a characteristic, I have arranged a field exciting winding 77 connected in series with the load circuit of the main generator 65 to provide a component of magnetic excitation along the secondary commutating axis of the metadyne exciter in a direction opposed to the excitation of the field exciting windings 75 and 76, as indicated by the arrow in Fig. 9. In this manner, the energization of this winding 77 varies with the load current of the main generator 65, and the voltage of the main generator, and therefore, the secondary voltage of the metadyne exciter varies in such a manner that the excitation of the series field exciting winding 77 is exactly equal and opposite in direction to the difference between the sum of the excitations of the two field exciting windings 75 and 76 and the excitation necessary to produce the load voltage. Thus, on open circuit with no-load current, and therefore, no differential series field excitation, the secondary voltage of the metadyne exciter 66 and the voltage of the main generator 65 are built up to a value corresponding to the point $l$; that is, it will be equal to the value $o$—$e$, and on short-circuit, with substantially no voltage across the brushes 67 and 68, the differential series excitation will be such as to buck down substantially all of the excitation produced by the field exciting windings 75 and 76, and will be equal and opposite to the excitation $o$—$g$, and be represented by the point $a$ in Fig. 7. For any intermediate load points, the differential excitation of the series differential field exciting winding 77 is equal to the difference between the ordinates of the saturation curve $o$—$h$—$l$ and the curve $g$—$l$, and is represented by the curve $a$—$b$—$c$—$d$—$e$. In order to obtain a substantially constant maximum limiting current characteristic $a$—$b$, the resistance of the circuit of the field exciting winding 76 is made such that the curve $o$—$k$ coincides substantially with the portion of the saturation curve $o$—$h$—$l$ representing the unsaturated characteristic of the metadyne exciter, so that the difference between the ordinates of the curves $o$—$h$—$l$ and $g$—$l$ is substantially constant for a wide range of voltage, and decreases rapidly beyond a predetermined value corresponding to the saturation point or "knee" in the saturation curve $o$—$h$—$l$. Since the energization of the series differential field exciting winding 77 is directly proportional to the load current of the main generator, the curve a—b—c—d—e also represents the relation of the load current of the main generator to the main generator voltage and provides the main generator with a drooping voltage-current characteristic having the desired voltage and current limiting values.

To obtain maximum efficiency from the prime mover 1, it is desirable that the voltage-current characteristic of the main generator should be substantially hyperbolic; that is, that the output of the main generator should be substantially constant at the speed at which the prime mover operates at maximum efficiency. This can be obtained by providing another component of magnetic excitation along the secondary commutating axis of the metadyne exciter 66, which is opposite in direction to the excitation of the field exciting windings 75 and 76; that is, in the same direction as that of the series differential field exciting winding 77. A field exciting winding 78 is arranged to provide a component of magnetic excitation in the direction indicated by the arrow in Fig. 9, and is arranged to be connected by an oscillatable relay 29 across the substantially constant potential of the saturated auxiliary dynamo-electric machine 69 in series with the variable voltage unsaturated auxiliary dynamo-electric machine 71 when the voltage of the unsaturated dynamo-electric machine 71 is equal to the voltage of the saturated dynamo-electric machine 69. The unsaturated dynamo-electric machine 71 is constructed so that its voltage is equal to that of the saturated dynamo-electric machine 69 when the load on the main generator corresponds to the values indicated by the points b and d which correspond to the maximum efficiency speed of the prime mover 1. The oscillatable relay 29 is provided with an armature connected across the auxiliary saturated dynamo-electric machine 69 through a current limiting resistor 30, and a field exciting winding 28 is arranged to provide an excitation thereto which varies in magnitude and direction with variations in the speed of the prime mover 1. One terminal of the field exciting winding 28 is connected to a terminal of the saturated dynamo-electric machine 69 and the other terminal of the field exciting winding is connected to an oscillatable contactor arm 27 which is mounted on a shaft 31 of the relay 29. This contactor 27 is arranged to engage contacts 23 and 24 which are connected respectively through the field exciting winding 78 of the metadyne exciter to a brush 73 of the unsaturated dynamo-electric machine 71, and directly to the brush 73 of the dynamo-electric machine 71. When the voltages of the unsaturated dynamo-electric machine 71 and the saturated dynamo-electric machine 69 are equal, that is, at the points b and d, no current flows through the field exciting winding 28 of the relay 29, and the relay is torqueless. Under this condition, a pair of biasing springs 35 and 36 are arranged to shift the throttle operating gear rack 34 to full open throttle position. This operation of the throttle operating gear rack rotates a gear wheel 32 which meshes with the gear rack 33 and is mounted on the shaft 31 of the oscillatable relay 29, and oscillates or turns the relay contactor arm 27 in a counter-clockwise direction from the position shown in Fig. 9. This completes an electrical circuit from the contact 24 through the contactor 27, through the relay field exciting winding 28, through the saturated dynamo-electric machine 69 and the unsaturated dynamo-electric machine 71 in series, and through the regulating field exciting winding 78. Under these conditions, if for any reason, load is added, the prime mover speed decreases slightly, and the voltage of unsaturated machine 71 also decreases, so that current flows from the saturated dynamo-electric machine 69 through the unsaturated dynamo-electric machine 71 and energizes the regulating field exciting winding 78 in the same direction as the series differential field exciting winding 77, as indicated by the arrow in the figure. This excitation reduces the differential excitation required to establish equilibrium conditions, and consequently the current in the series differential field exciting winding 77 is decreased, so that the load current decreases and the prime mover speed increases again. This excitation of the regulating field exciting winding 78 is represented by the difference between the ordinates of the curve b—c—d and b—f—d, as this winding is energized in accordance with the difference in potential between the constant voltage of the auxiliary generator 69 and the variable voltage of the auxiliary generator 71 which depends upon the speed of the prime mover 1. The operation of this type of field exciting winding is described in my United States Patent 2,038,384, April 21, 1936.

For any operating condition represented by the curves a—b and d—e the speed of the prime mover 1 will tend to be higher than the maximum efficiency operating speed, so that the voltage of the unsaturated auxiliary dynamo-electric machine 71 will be higher than the voltage of the saturated dynamo-electric machine 69. Under these conditions a current will tend to flow from the unsaturated dynamo-electric machine 71 through the field exciting winding 28 of the relay 29 to the saturated dynamo-electric machine 69. This current energizes the field exciting winding 28 in such a direction that the torque developed by the relay 29 is in a clockwise direction, and acts against the biasing force of the spring 36, thereby tending to close the prime mover throttle, and consequently, decreasing the speed of the prime mover 1, and also tends to oscillate or turn the contactor 27 in a clockwise direction. Such a movement of the contactor 27 opens the circuit between the contactor 27 and the contact 24, thereby opening the circuit of the field exciting winding 78 so that it becomes inoperative and completes a circuit between the contactor 27 and the contact 23. In this manner, the unsaturated dynamo-electric machine 71 remains connected in series with the saturated dynamo-electric machine 69 and the field exciting winding 28 remains energized in the same direction as before. Under these conditions, the differential excitation of the series differential field exciting winding 77 follows the curves a—b or d—e, and thereby limits the recondary current or voltage, respectively, of the metadyne exciter 66. The main generator also will have a voltage-current characteristic represented by the curves a—b and d—e, and its maximum current and voltage will thereby be limited to predetermined safe operating values as desired. In this manner the main generator 65 of conventional construction is provided with the desired operating characteristics by the metadyne exciter 66.

It is often desirable to obtain electrical load characteristics in an electrical power system without the use of electrical circuit changing, or switching devices. In Fig. 10, I have shown another embodiment of my invention wherein the main generator is provided with the desired inherent load characteristics without the use of any circuit changing or switching devices. The same reference numerals as those of Figs. 1, 2, and 9 are applied to corresponding elements in this figure. This system is very similar to that of Fig. 9, and utilizes a conventional dynamo-electric machine 65 as the main generator. A prime mover 1, such as a Diesel engine, having a substantially constant torque characteristic is arranged to drive the main generator 65 through a shaft 3, and the generator is supplied with excitation by a field exciting winding 10. An electrical load comprising driving motors 9 is connected across the brushes 67 and 68 of the generator. For the reasons stated above, it is desirable that the generator should have a substantially constant power output at the maximum efficiency speed of the prime mover over the greater part of its operating range, and that the generator characteristic should limit the maximum voltage and maximum current to safe operating values. In order to obtain such a characteristic, I provide a metadyne exciter 66 with special field exciting windings energized so as to provide inherently and automatically the main generator field exciting winding 10 with the desired excitation. By operating the main generator 65 as a substantially unsaturated machine, its voltage-current characteristic bears a substantially direct linear relation to the excitation provided by its field exciting winding 10, and therefore, to the secondary voltage-current characteristic of the metadyne exciter 66.

As in Fig. 9, the energization of the field exciting windings of the metadyne exciter 66 is provided by the main generator 65 in accordance with certain of its operating characteristics in conjunction with two auxiliary dynamo-electric machines and a battery 6, which is arranged to provide a substantially constant potential source of electrical power supply. The metadyne exciter 66 is of the conformer type, and is provided with a pair of primary brushes 12 and 13 which are short circuited, similar to the exciter shown in Fig. 9. The field exciting winding 10 of the main generator 65 is connected across a pair of secondary brushes 14 and 15 of the metadyne exciter 66, and therefore, the energization of this field has the same characteristics as the secondary characteristics of the conformer metadyne 66. These secondary circuit characteristics are determined by field exciting windings arranged to provide four components of magnetic excitation along the secondary commutating axis of the machine. The energizations of these field exciting windings are represented by the curves in Fig. 13. A field exciting winding 75 is connected across a substantially constant potential electric battery 6, and provides a substantially constant component of magnetic excitation along the secondary commutating axis of the metadyne exciter in a given direction, as represented by the arrow in Fig. 10. The curve $g—h$ in Fig. 13 represents the relation between the ampere-turns energization of the field exciting winding 75 and the secondary voltage across the secondary brushes 14 and 15 of the metadyne exciter 66, or the voltage of the main generator 65. Another field exciting winding 76 is arranged to provide a component of magnetic excitation along the secondary commutating axis of the metadyne exciter in the direction indicated by the arrow in Fig. 10, and is connected to provide a component of excitation which varies with the voltage of the main generator or the secondary metadyne voltage. To obtain this result, it is connected across the brushes 67 and 68 of the main generator. The component of energization provided by this field exciting winding varies as a linear function of the voltage of the main generator 65, and therefore, of the secondary voltage of the metadyne exciter 66. This relationship is represented by the curve $o—k$ in Fig. 13, and the curve $g—l$ represents the relation of the sum of the energizations of the field exciting windings 75 and 76 to the secondary voltage of the metadyne exciter 66, or the voltage of the main generator 65. The curve $o—h—l—x$ represents the saturation curve of the metadyne exciter 66, and therefore, if only the above field exciting windings are energized, the secondary voltage of the exciter, and the voltage of the main generator will follow the curve $o—h—l—x$ and come to equilibrium at a value corresponding to the intersection point $l$ of the curves $o—h—l—x$ and $g—l$.

As stated above, it is desirable that the main generator characteristic should have limiting voltage and limiting current values, as well as, a substantially constant power characteristic over the greater part of its operating range. In order to obtain such a characteristic, I have arranged a field exciting winding 77 connected in series with a load circuit of the main generator 65 to provide a component of magnetic excitation along the secondary commutating axis of the metadyne exciter in a direction opposed to the excitation of the field exciting windings 75 and 76, as indicated by the arrow in Fig. 10. In this manner, the energization of this field exciting winding varies with the load current of the main generator 65, and the voltage of the main generator and, therefore, the voltage of the metadyne exciter, varies in such a manner that the excitation of the series field exciting winding 77 is equal and opposite in direction to the difference between the sum of the excitations along the secondary commutating axis of the metadyne 66 in the direction of the excitations produced by the field exciting windings 75 and 76, and the excitation necessary to produce the load voltage. This load voltage is determined by the saturation of the curve of the machine.

In order to obtain inherently the desired characteristics, I provide a special dynamo-electric machine which is provided with a field exciting winding 80 connected directly across the constant potential battery 6. This field exciting winding provides a substantially constant component of magnetic excitation to the dynamo-electric machine 79 in the direction indicated by the arrow in Fig. 10, and is arranged to saturate substantially the dynamo-electric machine 79, so that under normal operating conditions, if this winding alone is energized, the dynamo-electric machine 79 will operate at about its saturation point, which is represented by the knee in its saturation curve. In Fig. 12, curve $f—o—b—c$ illustrates the saturation curve for the dynamo-electric machine 79, and the point $b$ on this curve represents the saturation point, and therefore, the condition under which the dynamo-electric machine 79 operates when only the field exciting winding 80 is energized. I provide an auxiliary dynamo-electric machine 21 which is excited by a field exciting winding 22 connected across its own terminals, so that it is a self-excited machine, and the field exciting winding 22 is arranged so that the dynamo-electric machine 21 operates as an unsaturated machine. In this manner, the voltage across the brushes of the dynamo-electric machine 21 varies considerably with small variations in the speed of this machine. In order to utilize the dynamo-electric machine 21 as a regulator, it is driven in a predetermined speed relation to the speed of the engine 1 through the shaft 3 by the prime mover 1, and is connected across a field exciting winding 81 on the auxiliary dynamo-electric machine 79 in series with the constant voltage battery 6 and a field exciting winding 28 of a throttle controlling dynamo-electric relay 29. The dynamo-electric machine 21 and its field exciting winding 22 are constructed so that the voltage generated by the dynamo-electric machine is exactly equal and opposite to that of the electric battery 6 when the speed of the prime mover 1 corresponds to its maximum efficiency speed. Under these conditions, no current flows through the field exciting winding 81 of the auxiliary dynamo-electric machine 79, and the excitation of this machine corresponds to the point b in Fig. 12. If for any reason the speed of the prime mover 1 decreases, as when additional load is placed on the main generator 65, the voltage of the auxiliary dynamo-electric machine 21 also decreases, so that current flows from the battery 6 through the field exciting winding 81 to the dynamo-electric machine 21. The field exciting winding 81 is arranged so that when current flows from the battery to the dynamo-electric machine 21, when the voltage of the dynamo-electric machine 21 is lower than that of the battery 6, the excitation produced by the field exciting winding 81 is opposite in direction to that provided by the field exciting winding 80. Under this condition, the dynamo-electric machine 79 operates as an unsaturated dynamo-electric machine. This range of operation is represented by the curve f—o—b in Fig. 12. The curve o—b illustrates the operation of the dynamo-electric machine 79 when the excitation provided by the field exciting winding 80 is greater than the excitation provided by the field exciting winding 81, and the curve o—f represents the characteristic of this machine when the excitation produced by the field exciting winding 80 is less than the excitation produced by the field exciting winding 81. If for any reason the speed of the prime mover 1 tends to increase above its maximum efficiency speed, as when load is reduced or removed from the main generator 65, the voltage generated by the dynamo-electric machine 21 becomes greater than that of the constant potential battery 6, and current flows from the dynamo-electric machine 21 through the field exciting winding 81 to the battery 6. Under this condition, the excitation produced by the field exciting winding 81 is in the same direction as that of the field exciting winding 80, and since the field exciting winding 80 substantially saturates the dynamo-electric machine 79, the voltage of this machine varies only slightly, due to the increased excitation produced by the field exciting winding 81. This is represented in Fig. 12 by the portion b—c of the saturation curve o—b—c.

A field exciting winding 82 is arranged to produce a component of magnetic excitation along the secondary commutating axis of the conformer metadyne exciter 66, and is connected across the brushes of the auxiliary dynamo-electric machine 79. In this manner, the field exciting winding 82 is energized in accordance with the resultant excitation produced by the field exciting windings 80 and 81 upon the auxiliary dynamo-electric machine 71. When the field exciting winding 81 is not energized, the excitation produced by the field exciting winding 82 corresponds to the value e—b, Fig. 12, and this is represented in Fig. 13 by the ampere-turns g—m. The curve m—n represents the constant excitation produced by the field exciting winding 82 in the direction indicated by the arrow in Fig. 10 corresponding to the energization of the field exciting winding by the auxiliary dynamo-electric machine 79, due to the excitation produced by the field exciting winding 80. Thus, the constant component of excitation along the secondary commutating axis of the metadyne exciter 66 comprises two components, that component produced by the field exciting winding 75 and represented in Fig. 13 by the curve g—h, and another component produced by the field exciting winding 82, and represented by the curve m—n. Thus, if the field exciting winding 81 of the auxiliary dynamo-electric machine 71 remains deenergized, the metadyne exciter 66 will have a drooping current voltage characteristic similar to that of the metadyne exciter in the system illustrated in Fig. 9, and which can be represented in Fig. 13 by the curve i—b—c—d—j.

The ordinates of this curve correspond to the difference in the ordinates between the saturation curve o—h—l—x and the curve m—u—w, which represents the sum of the component excitations in the same direction in the system of Fig. 10. As explained above, the field exciting winding 81 is deenergized only when the prime mover 1 operates at its maximum efficiency speed, and this corresponds in Fig. 13 to the points b and d, and in Fig. 12 to the point b. In order to obtain the desired current and voltage limiting characteristics and the constant power characteristic, the energization of the field exciting winding 82 is varied by the energization of the field exciting winding 81. As has been explained above, these characteristics are obtained by varying the component of excitation provided to the metadyne exciter 66 by the field exciting winding 82. This component of excitation is represented in Fig. 13 by the curve p—q—r—s—t, and the portions p—q and s—t of this curve represent the excitation of the field exciting winding 82 when the speed of the prime mover 1 is slightly higher than the maximum efficiency speed and corresponds to the operation of the auxiliary dynamo-electric machine 79 as a saturated machine. The portion q—r—s of this curve represents the excitation produced by the field exciting winding 82 when the auxiliary dynamo-electric machine 79 operates as an unsaturated dynamo-electric machine, that is, when the excitation of the field exciting winding 81 opposes the excitation of the field exciting winding 80 due to the fact that the voltage of the auxiliary dynamo-electric machine 21 is less than the voltage of the constant potential battery 6. This condition occurs when the load on the prime mover 1 is increased, so that its speed tends to fall below its maximum efficiency speed. Thus, the sum of the excitations produced by the field exciting windings 75, 76, and 82, all of which provide excitation in the same direction along the secondary commutating axis of the metadyne exciter 66 is represented by the curve p—u—v—w—x in Fig. 13. The ordinates of this curve represent the sum of the ordinates of the curves o—k, g—h, and p—q—r—s—t. In this manner, the substantially constant excitation of the metadyne exciter 66 is slightly increased over the value o—m to the value o—p, but this increase is very slight, and is due only to the slight increase provided by the field exciting winding 81 when the auxiliary dynamo-electric machine 79 operates as a saturated machine. Thus, the energization of the series differential field exciting winding 77 will be equal and opposite to the excitation represented by the difference in the ordinates of the saturation curve o—h—l—x and the curve p—u—v—w—x, representing excitation required by saturation of the exciter 66 and the sum of the excitations produced by the field exciting windings 75, 76, and 82, respectively. This energization of the series field exciting winding 77 will result under all operating conditions, as the current in this field exciting winding will vary in such a manner that the excitation of this field exciting winding 77 will buck down the total excitation of the metadyne exciter 66 to a net value corresponding to the voltage required for that particular load, as indicated by the saturated curve o—h—l—x. In Fig. 13, the curve a—y—f—z—e represents the energization of the series differential field exciting winding 77, and therefore, represents the relation of the current through this field exciting winding to the secondary voltage of the metadyne exciter 66, or the voltage of the main generator 65. Thus, it is seen that the inherent voltage-current characteristic of the main generator 65 is represented in Fig. 13 by the curve a—y—f—z—e. In this manner, whenever the load on the main generator 65 is such that the speed of the prime mover 1 tends to increase over its maximum efficiency speed, the field exciting windings 75, 76, and 82 on the metadyne exciter 66 tend to limit the secondary current or voltage of the metadyne exciter 66, and therefore, of the main generator 65. This operation is represented in Fig. 13 by the portions a—y and z—e of the curve a—y—f—z—e, and the points y and z represent the conditions when the voltage of the auxiliary dynamo-electric machine 21 is equal to the voltage of the constant potential battery 6, and therefore, when the prime mover 1 is operating at its maximum efficiency speed. Whenever the load on the main generator 65 tends to increase, the speed of the prime mover 1 will tend to decrease, and the excitation of the field exciting winding 82 will be reduced, so that the load will become less, and the speed of the prime mover 1 will again increase to substantially the maximum efficiency speed. The operation of this type of winding is described in my United States Patent 2,038,384, April 21, 1936. In this manner, the main generator 65 will have a substantially constant power output characteristic y—f—z, which corresponds substantially to the hyperbolic relation represented by the curve b—f—d.

As in Figs. 1, 2, and 9, I provide a throttle controlling oscillatable relay 29, the armature of which is connected across the substantially constant potential battery 6 in series with a current limiting resistor 30, and which is provided with a field exciting winding 28 connected in series with the unsaturated auxiliary dynamo-electric machine 21 and the battery 6. A shaft 31 connects the relay 29 to a gear wheel 32 which meshes with the gear rack 33. As has been explained with respect to the above-mentioned figures, when the speed of the prime mover 1 corresponds to its maximum efficiency speed, no current flows through the field exciting winding 28, as the voltage of the auxiliary dynamo-electric machine 21 and the battery 6 are exactly equal and opposite, and the relay 29 is torqueless. Under this condition, a pair of biasing springs 35 and 36 actuate a throttle controlling gear rack 33 to the full open throttle position. Furthermore, whenever the load on the prime mover 1 is lessened, with the consequent increase in speed of the prime mover above the maximum efficiency speed, the voltage of the auxiliary dynamo-electric machine 21 becomes greater than that of the constant potential battery 6, and current flows through the field exciting winding 28 of the relay 29 in such a direction that the relay 29 exerts a torque in a counter-clockwise direction in the figure. Thus, when the load on the prime mover 1 is lessened, the relay 29 exerts a counter-clockwise torque which turns or rotates the gear wheel 32 in a counter-clockwise direction, and tends to partially close the throttle of the prime mover 1 and decreases the power developed by the prime mover. In this manner, the system disclosed in Fig. 10 inherently provides the desired operating charactertistics without the use of circuit changing or switching devices.

In Fig. 11 I have illustrated another power system wherein the desired electrical load characteristics are obtained inherently and automatically without the use of electric circuit changing or switching devices somewhat similar to the system illustrated in Fig. 10. The same reference numerals as those of Figs. 1, 2, 9, and 10 are applied to corresponding elements in this figure. As shown in Figs. 9 and 10, this system utilizes a conventional dynamo-electric machine 65 as the main generator. A prime mover 1, such as a Diesel engine, having a substantially constant torque characteristic, is arranged to drive the main generator 65 through a shaft 3, and the generator is supplied with excitation by a field exciting winding 10. An electrical load comprising driving motors 9 is connected to the brushes 67 and 68 of the generator. As stated with respect to the other systems, it is desirable that the generator 65 should have a substantially constant power output over the greater part of its operating range, and that the generator characteristic should limit the maximum current and voltage to safe operating values. In order to obtain such a characteristic, I provide a metadyne exciter 83 with special field exciting windings energized so as to provide the main generator field exciting winding 10 with the desired excitation. By operating the main generator 65 as a substantially unsaturated machine over a portion of its operating range, its voltage-current characteristic bears a substantially linear relation over this operating range to the excitation provided by its field exciting winding 10, and therefore, to the secondary voltage-current characteristic of the metadyne exciter 83.

The excitation of the field exciting windings of the metadyne exciter 83 is provided by the main generator 65 in accordance with certain of its operating characteristics in conjunction with a regulator field exciting winding energized in accordance with the speed of the machine and a field exciting winding arranged to provide a substantially constant component of excitation. The metadyne exciter 83 is of the conformer type and is provided with a pair of primary brushes 12 and 13 which are short-circuited through a small resistance provided by a field exciting winding 84 arranged on an oscillatable dynamo-electric relay 85. The field exciting winding 10 of the main generator 65 is connected across a pair of secondary brushes 14 and 15 of the metadyne exciter 83, and therefore, the energization of this field exciting winding has the same characteristics as the secondary characteristics of the conformer metadyne exciter 83. These secondary circuit characteristics are determined by field exciting windings arranged to provide four components of magnetic excitation along the secondary commutating axis of the machine. The energizations and excitations of these field exciting windings are represented by curves in Fig. 6. A field exciting winding 75 is connected across a substantially constant potential electric battery 6 and provides a substantially constant component of excitation along the secondary commutating axis of the metadyne exciter 83 in a given direction as represented by the arrow in Fig. 11. The curve g—h in Fig. 6 represents the relation between the ampere-turns of energization of the field exciting winding 75 and the secondary voltage across the secondary brushes 14 and 15 of the metadyne exciter 83 or the voltage of the main generator 65. Another field exciting winding 76 is arranged to provide a component of magnetic excitation along the secondary commutating axis of the metadyne exciter 83 in the direction indicated by the arrow in Fig. 11. This field exciting winding is connected to provide a component of excitation which varies with the voltage of the main generator or the secondary metadyne exciter voltage and is connected across the brushes 67 and 68 of the main generator. The component of energization provided by this field exciting winding varies as a linear function of the voltage of the main generator 65, and therefore, of the voltage of the metadyne exciter 66. This relationship is represented by the curve o—k in Fig. 6, and the curve g—l represents the relation of the sum of the energizations of the field exciting windings 75 and 76 to the secondary voltage of the metadyne exciter 83 or the voltage of the main generator 65. The curve o—h—l represents the saturation curve of the metadyne exciter 83, and therefore, if only the above field exciting windings are energized, the secondary voltage of the metadyne exciter, and therefore, the voltage of the main generator will follow the curve o—h—l and come to equilibrium at a value corresponding to the intersection point l of the curves o—h—l and g—l.

In order to obtain a generator characteristic having a limiting voltage and limiting current, I have arranged a field exciting winding 77 connected in series with the load circuit of the main generator 65 to provide a component of magnetic excitation along the secondary comutating axis of the metadyne exciter 83, in a direction opposite to the excitation of the field exciting windings 75 and 76 as indicated by the arrow in Fig. 11. In this manner, the energization of this field exciting winding varies with the load current of the main generator, and therefore, the voltage of the metadyne exciter and the voltage of the main generator, vary in such a manner that the excitation of the series field exciting winding 77 is equal and opposite in direction to the difference between the sum of the excitations along the secondary commutating axis of the metadyne exciter 83 in the direction of the excitations produced by the field exciting windings 75 and 76 and the excitation necessary to produce the load voltage for any given load current. This load voltage is determined by the saturation curve of the machine.

In order inherently to obtain the desired characteristics, I provide an auxiliary dynamo-electric machine 21 which acts as a speed regulator and is excited by a field exciting winding 22 connected across its own terminals, so that it is a self-excited machine. The field exciting winding 22 also is arranged so that the dynamo-electric machine 21 operates as an unsaturated machine. Thus, the voltage across the brushes of the dynamo-electric machine 21 varies considerably with small variations in the speed of this machine. In order to utilize the dynamo-electric machine 21 as a speed regulator, it is driven in a predetermined speed relation to the speed of the engine 1 through the shaft 3 and is connected across a field exciting winding 17 arranged to provide a component of magnetic excitation along the secondary commutating axis of the metadyne exciter 83 and is connected in series with the constant potential battery 6. The dynamo-electric machine 21 and its field exciting winding 22 are constructed so that the voltage generated by the dynamo-electric machine is exactly equal and opposite to that of the electric battery 6 when the speed of the prime mover 1 corresponds to its maximum efficiency speed. Under these operating conditions, no current flows through the field exciting winding 17 and the excitation provided by this field exciting winding under these conditions corresponds to the points b and d in Fig. 6. If for any reason the speed of the prime mover decreases, as when additional load is placed on the main generator 65, the voltage of the auxiliary dynamo-electric machine 21 also decreases, so that current flows from the battery 6 through the field exciting winding 17 to the dynamo-electric machine 21, and the excitation produced by the field exciting winding 17 under these conditions is opposite in direction to that produced by the field exciting windings 75 and 76. If, on the other hand, the load in the prime mover decreases beyond that developed by the prime mover, the speed of the set tends to increase and the voltage of the auxiliary dynamo-electric machine 21 becomes greater than that of the battery, and current flows from the auxiliary 21 through the field exciting winding 17 to the battery 6. Under these conditions, the field exciting winding 17 provides a component of magnetic excitation in the same direction as the flux produced by the field exciting windings 75 and 76. The operation of this type of field exciting winding does not form part of this invention, and is covered by my U. S. Patent 2,038,384, April 21, 1936. The excitation produced by the regulator field exciting winding 17 is represented by the difference in the ordinates between the curves b—c—d and b—f—d in Fig. 6. Thus, the main generator 65 is provided with an excitation by the field exciting winding 10 which varies in accordance with the curve i—b—f—d—j in Fig. 6. Since it is not usually desirable to operate large dynamo-electric machines as unsaturated machines throughout their practical range of operation as unsaturated machine over their entire range of operation, saturation of such machines will tend to vary the operating characteristics from that represented by the curve i—b—f—d—j, although such variations will generally be very small, and the resultant characteristic may be represented by the curve a—b—f—d—e.

Since the prime mover 1 is a substantially constant torque machine operating at a substantially constant speed for any given throttle condition, its power will not be sufficiently utilized if the load on the main generator 65 does not remain substantially constant at full open throttle. It is desirable, therefore, that the throttle opening be varied in accordance with the load on the main generator 65, and this may be done by controlling the throttle position of the engine 1. This control is provided by operation of a gear rack 33 which is biased by a spring 36 to full open throttle position. A gear wheel 32 mounted on a shaft 31 engages the gear rack 33 and is arranged to vary the position of the throttle under different operating conditions. The gear wheel 32 is driven by another gear wheel 86 through a worm gear 87 by the oscillatable dynamo-electric relay 85 or another similar dynamo-electric relay 88. The armatures of the relays 85 and 88 are mounted on a shaft 89 which carries a worm gear 87 and the field exciting windings of these two relays are arranged to provide excitation to the two relays so that the torques of the rotatable elements of the relays tend to turn the worm gear 87 in opposite directions. The armatures 85 and 88 of the two relays are connected in series with a current-limiting resistor 90 across the electric battery 6. The field exciting winding 84 of the relay 85 is connected in series with the primary brushes of the auxiliary metadyne exciter 83, and therefore, provides an excitation to the relay 85 in accordance with the primary current flowing in the primary circuit of the metadyne exciter. In this manner, the energization of the field exciting winding 84 will be proportional to the secondary voltage of the auxiliary metadyne 83 as long as the metadyne operates as an unsaturated machine, but if the metadyne 83 becomes saturated, the primary current increases rapidly for slight increase in secondary voltage. This is represented in Fig. 6 by the curve $o-r-n$. A second field exciting winding 91 is arranged on the relay 85 to provide an excitation thereto in opposition to the excitation provided by the field exciting winding 84, and is connected across the terminals of the main generator 65. This provides a component of excitation to the relay 85 which varies in accordance with the voltage of the main generator 65, and therefore, varies substantially in accordance with the secondary voltage of the metadyne exciter 83. The excitation provided by the field exciting winding 91 is represented by the curve $o-s-m$ in Fig. 6, and the resistance of the field exciting winding 91 is made such that the excitation produced by this field exciting winding is substantially equal and opposite to that produced by the field exciting 84 as long as the metadyne exciter 83 operates as an unsaturated machine. In this manner, the auxiliary dynamo-electric relay 85 is substantially torqueless for all voltages of the main generator 65 below a voltage corresponding to the point $d$ in Fig. 6, as it has very little excitation below this point as represented by the difference in the ordinates between the curves $o-r$ and $o-s$. Beyond the point $d$, the excitation of the relay 85 increases very rapidly, and the excitation of this machine under these conditions corresponds to the difference in the ordinates between the curves $r-n$ and $s-m$. The relay 85 and the biasing spring 36 are so constructed that the torque developed by the relay 85 under the excitation $s-r$ is sufficient to close partially the throttle of the prime mover 1, and as the speed of the prime mover 1 tends to increase from $d$ to $e$, the torque of the relay 85 increases from $s-r$ to $m-n$, thereby closing the prime mover throttle and decreasing the power developed by the engine 1.

Furthermore, when the generator 65 operates along that portion of its characteristic which is represented by the curve $a-b$ in Fig. 6, the speed of the prime mover 1 tends to be higher than its maximum efficiency speed if the generator 65 does not utilize all the power developed by the prime mover. Under these conditions, it was desirable that the prime mover throttle should be partially closed. I provide a field exciting winding 92 arranged to excite the dynamo-electric machine relay 88 to provide a torque to this relay which varies in accordance with the load current of the main generator. This field exciting winding 92 is, therefore, connected in series with the load circuit of the main generator 65. The relay 88 and the throttle biasing spring 36 are so constructed that the torque developed by the relay is not sufficient to operate the throttle controlling mechanism for any value of load current below that represented by $b$ in Fig. 6. However, when the load current increases above the value $b$ along the characteristic represented by the curve $a-b-j-d-e$, the relay 88 develops torque in such a direction that it tends to close the prime mover throttle against the tension of the biasing spring 36, and reduces the power developed by the prime mover 1. Thus, whenever the prime mover 1 tends to develop more power than is required by the load on the generator 65, the throttle controlling mechanism tends to vary the throttle opening and controls the power developed by the prime mover to that required by the load on the main generator 65. The changes in speed produced by variations in throttle position of the prime mover also tend to produce slight changes in the operating characteristic of the main generator 65 and these slight changes coupled with saturation variations in the characteristic of the main generator 65 result in the differences between the operating characteristic $a-b-j-d-e$ and that represented by the curve $i-b-j-d-j$. Thus, it is seen that I have provided a power system without electric circuit changing or interrupting devices wherein a conventional generator is provided with an operating characteristic having current and voltage limiting portions and a substantially constant power portion over its main operating range.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. An excitation system for a dynamo-electric machine including a field exciting winding, dynamo-electric means arranged to energize said field exciting winding, and means for varying the energization provided by said dynamo-electric means to regulate the power output of the dynamo-electric machine to a substantially constant value within predetermined limits of electrical potential and current and to limit the electrical potential and current of said dynamo-electric machine to predetermined maximum values.

2. An excitation system for a dynamo-electric machine including a field exciting winding, dynamo-electric means arranged to energize said field exciting winding, and means for varying automatically the energization provided by said dynamo-electric means to regulate the power output of the dynamo-electric machine to a substantially constant value within predetermined limits of electrical potential and current and to limit the electrical potential and current of said dynamo-electric machine to predetermined maximum values.

3. An excitation system for a dynamo-electric machine including a field exciting winding, an auxiliary dynamo-electric machine arranged to energize said field exciting winding, means including a second field exciting winding for varying the energization provided by said auxiliary dynamo-electric machine to regulate inherently the power output of said first-mentioned dynamo-electric machine to a substantially constant value within predetermined limits of electrical potential and current, and means for varying the energization provided by said auxiliary dynamo-electric machine to vary inherently the power output of said first-mentioned dynamo-electric machine when the electrical potential or current thereof tends to exceed said predetermined electrical potential or current.

4. An excitation system for a dynamo-electric machine including a field exciting winding, dynamo-electric means arranged to energize said field exciting winding, means for varying automatically the energization provided by said dynamo-electric means to regulate the power output of the dynamo-electric machine to a substantially constant value within predetermined limits of electrical potential and electric current and to limit the electrical potential and current of said dynamo-electric machine to predetermined maximum values, and means dependent upon variations in an electrical characteristic of said dynamo-electric machine for varying the energization provided by said dynamo-electric means so as to oppose said variations of said electrical characteristic.

5. An excitation system for a dynamo-electric machine including a field exciting winding, an auxiliary dynamo-electric machine arranged to energize said field exciting winding, means including a second field exciting winding for varying the energization provided by said auxiliary dynamo-electric machine to regulate the power output of said first-mentioned dynamo-electric machine to a substantially constant value within predetermined limits of electrical potential and current, and means including a third field exciting winding for varying the energization provided by said auxiliary dynamo-electric machine to vary the power output of said first-mentioned dynamo-electric machine when the electrical potential or current thereof tends to exceed said predetermined electrical potential or current.

6. An excitation system for a dynamo-electric machine including a field exciting winding, an auxiliary dynamo-electric machine arranged to energize said field exciting winding, means including a second field exciting winding for varying the energization provided by said auxiliary dynamo-electric machine to regulate automatically the power output of said first-mentioned dynamo-electric machine to a substantially constant value within predetermined limits of electrical potential and current, and means including a third field exciting winding for varying the energization provided by said auxiliary dynamo-electric machine to vary automatically the power output of said first mentioned dynamo-electric machine when the electrical potential or current thereof tends to exceed said predetermined electrical potential or current.

7. An excitation system for a main dynamo-electric machine including a field exciting winding therefor, a metadyne dynamo-electric machine provided with a rotatable member having a commutator arranged to energize said main dynamo-electric machine field exciting winding, said metadyne dynamo-electric machine being provided with a primary brush set and a secondary brush set electrically displaced from said primary brush set and arranged to provide a primary commutating axis and a secondary commutating axis respectively for said rotatable member, a field exciting winding for said metadyne dynamo-electric machine arranged to provide a component of magnetic excitation along the secondary commutating axis thereof dependent upon an electrical characteristic of said main dynamo-electric machine, means for providing a substantially constant component of magnetic excitation along the secondary commutating axis of said metadyne dynamo-electric machine, means dependent upon the speed of said main dynamo-electric machine for maintaining substantially constant power output thereof between predetermined values of electrical potential and current, and means for controlling a component of magnetic excitation along the secondary commutating axis of said metadyne dynamo-electric machine to limit the secondary current and the secondary voltage thereof to a predetermined maximum value.

8. An excitation system for a main dynamo-electric machine including a field exciting winding therefor, a metadyne dynamo-electric machine provided with a rotatable member having a commutator arranged to energize said main dynamo-electric machine field exciting winding, said metadyne dynamo-electric machine being provided with a primary brush set and a secondary brush set electrically displaced from said primary brush set and arranged to provide a primary commutating axis and a secondary commutating axis respectively for said rotatable member, a field exciting winding for said metadyne dynamo-electric machine arranged to provide a component of magnetic excitation along the secondary commutating axis thereof dependent upon an electrical characteristic of said main dynamo-electric machine, means for providing a substantially constant component of magnetic excitation along the secondary commutating axis of said metadyne dynamo-electric machine, means dependent upon the speed of said main dynamo-electric machine for maintaining substantially constant power output thereof between predetermined values of electrical potential and current, and means for controlling a component of magnetic excitation along the secondary commutating axis of said metadyne dynamo-electric machine to limit the secondary current and the secondary voltage thereof to a predetermined maximum value, and means for providing a component of magnetic excitation along the secondary commutating axis of said metadyne dynamo-electric machine dependent upon variations in an electrical characteristic of said main dynamo-electric machine to oppose said variations of said electrical characteristic.

9. A power system including a prime mover, a main generator driven by said prime mover, a field exciting winding for said main generator, a metadyne dynamo-electric machine provided with a rotatable member having a commutator arranged to energize said main generator field exciting winding, said metadyne dynamo-electric machine being provided with a primary brush set and a secondary brush set electrically displaced from said primary brush set and arranged to provide a primary commutating axis and a secondary commutating axis for said rotatable member respectively, a field exciting winding for said metadyne dynamo-electric machine arranged to provide a component of magnetic excitation along the secondary commutating axis thereof dependent upon an electrical characteristic of said main generator, means for providing a substantially constant component of magnetic excitation along the secondary commutating axis of said metadyne dynamo-electric machine, means for providing a component of magnetic excitation along the secondary commutating axis of said metadyne dynamo-electric machine dependent upon the speed of said main generator, and means for controlling a component of magnetic excitation along the secondary commutating axis of said metadyne dynamo-electric machine to limit the secondary current and secondary voltage thereof to a predetermined maximum value.

10. A power system including a prime mover, dynamo-electric means for varying the power developed by said prime mover dependent upon the operating speed thereof, a main electric generator driven by said prime mover, a field exciting winding for said main generator, a metadyne dynamo-electric machine arranged as an exciter to energize said generator field exciting winding, means including a field exciting winding on said metadyne energized in accordance with a difference of electrical potential between a constant potential and an electrical potential dependent upon the speed of said prime mover for maintaining the speed thereof substantially constant, a second field exciting winding on said metadyne exciter arranged to provide a component of excitation thereto on the same axis as said first-mentioned field exciting winding, means for energizing said second metadyne field exciting winding by a substantially constant potential source of electrical power supply, a third field exciting winding on said metadyne exciter arranged to provide a component of excitation thereto in opposition to said second field exciting winding, and means for energizing said third metadyne field exciting winding dependent upon an electrical characteristic of said main generator.

11. An excitation system for a main dynamo-electric machine including a field exciting winding therefor, a metadyne dynamo-electric machine arranged as an exciter to energize said main machine field exciting winding, a field exciting winding for said metadyne exciter, means for energizing said metadyne field exciting winding by substantially constant source of electrical power supply, a second field exciting winding on said metadyne exciter arranged to provide a component of excitation thereto in opposition to said first-mentioned metadyne field exciting winding, means for energizing said second metadyne field exciting winding dependent upon the load current of said main dynamo-electric machine, a third field exciting winding arranged on said metadyne exciter to provide a component of excitation thereto in opposition to said second metadyne field exciting winding, and means for energizing said third metadyne field exciting winding dependent upon the load voltage of said main dynamo-electric machine.

12. An excitation system for a main dynamo-electric machine including a field exciting winding therefor, a metadyne dynamo-electric machine arranged as an exciter to energize said main machine field exciting winding, a field exciting winding for said metadyne exciter, means for energizing said metadyne field exciting winding by a substantially constant source of electrical power supply, a second field exciting winding on said metadyne exciter arranged to provide a component of excitation thereto in opposition to said first-mentioned metadyne field exciting winding, means for energizing said second metadyne field exciting winding dependent upon the load current of said main dynamo-electric machine, a third field exciting winding arranged on said metadyne exciter to provide a component of excitation thereto in opposition to said second metadyne field exciting winding, means for energizing said third metadyne field exciting winding dependent upon the load voltage of said main dynamo-electric machine, a fourth field exciting winding arranged on said metadyne exciter energized by a difference in voltage between a substantially constant voltage and a voltage dependent upon the speed of said main dynamo-electric machine.

13. A power system including a prime mover, dynamo-electric means for varying the power developed by said prime mover dependent upon the operating speed thereof, a main electric generator driven by said prime mover, a field exciting winding for said main generator, a metadyne dynamo-electric machine arranged as an exciter to energize said main generator field exciting winding, means including a field exciting winding on said metadyne energized in accordance with a difference of electrical potential between a constant potential and an electrical potential dependent upon the speed of said prime mover for maintaining the speed thereof substantially constant, means including said dynamo-electric means for controlling the energization of said first-mentioned metadyne field exciting winding to de-energize the same above a predetermined electrical potential and a predetermined electric current of said main generator, means including a second field exciting winding on said metadyne exciter for providing a component of excitation thereto dependent upon variations of an electrical characteristic of said main generator arranged to oppose said electrical characteristic variations, an auxiliary dynamo-electric machine exciter, means including a field exciting winding for said auxiliary exciter for providing a substantially constant component of magnetic excitation thereto, means including a second field exciting winding for said auxiliary exciter arranged to provide a component of magnetic excitation thereto in opposition to said constant excitation field exciting winding dependent upon an electrical characteristic of said main generator, and means including a field exciting winding on said metadyne exciter energized by said auxiliary exciter and for providing a component of excitation to said metadyne exciter in opposition to said first-mentioned metadyne field exciting winding.

14. A power system including a prime mover, dynamo-electric means for varying the power developed by said prime mover dependent upon the operating speed thereof, a main electric generator driven by said prime mover, a field exciting winding for said main generator, a metadyne dynamo-electric machine arranged as an exciter to energize said generator field exciting winding, means including a field exciting winding on said metadyne energized in accordance with a difference of electrical potential between a constant potential and an electrical potential dependent upon the speed of said prime mover for maintaining the speed thereof substantially constant, means including said dynamo-electric means for controlling the energization of said first-mentioned metadyne field exciting winding to deenergize the same above a predetermined electrical potential and a predetermined electric current of said main generator, a second field exciting winding on said main generator, a second field exciting winding on said metadyne exciter, means for connecting said second main generator field exciting winding across said second metadyne field exciting winding, a third field exciting winding on said metadyne exciter arranged to provide a component of excitation thereto in opposition to said first-mentioned metadyne field exciting winding, means for energizing said third metadyne field exciting winding by a substantially constant potential source of electric power supply, means for varying the energization of said third metadyne field exciting winding dependent upon an electrical characteristic of said main generator, a fourth field exciting winding on said metadyne exciter arranged to provide a component of excitation thereto in the same direction as said first-mentioned field exciting winding, and means for energizing said fourth metadyne field exciting winding dependent upon an electrical characteristic of said main generator.

15. A power system including a prime mover, dynamo-electric means for varying the power developed by said prime mover dependent upon the operating speed thereof, a main electric generator driven by said prime mover, a field exciting winding for said main generator, a metadyne dynamo-electric machine arranged as an exciter to energize said generator field exciting winding, a field exciting winding on said metadyne exciter arranged to provide a component of excitation thereto, means for energizing said metadyne field exciting winding by a substantially constant potential source of electrical power supply, a second field exciting winding on said metadyne exciter arranged to provide a component of excitation thereto in opposition to said first-mentioned field exciting winding, means for energizing said second metadyne field exciting winding dependent upon an electrical characteristic of said main generator, a third field exciting winding on said metadyne exciter arranged to provide a component of excitation thereto in opposition to said second field exciting winding, and means for energizing said third metadyne field exciting winding dependent upon the voltage of said main generator.

16. A power system including a prime mover, dynamo-electric means for varying the power developed by said prime mover dependent upon the operating speed thereof, a main electric generator driven by said prime mover, a field exciting winding for said main generator, a metadyne dynamo-electric machine arranged as an exciter to energize said generator field exciting winding, means including a field exciting winding on said metadyne energized in accordance with a difference of electrical potential between a constant potential and an electrical potential dependent upon the speed of said prime mover for maintaining the speed thereof substantially constant, a second field exciting winding on said metadyne exciter arranged to provide a component of excitation thereto in opposition to said first-mentioned field exciting winding, means for energizing said second metadyne field exciting winding by a substantially constant potential source of electrical power supply, a third field exciting winding on said metadyne exciter arranged to provide a component of excitation thereto in the same direction as said first-mentioned field exciting winding, means for energizing said third metadyne field exciting winding dependent upon the load current of said main generator, a fourth field exciting winding on said metadyne exciter arranged to provide a component of excitation thereto in opposition to said third field exciting winding, and means for energizing said fourth metadyne field exciting winding dependent upon the voltage of said main generator.

17. A power system including a prime mover, means for varying the power developed by said prime mover dependent upon the operating speed thereof, a main electric generator driven by said prime mover, a field exciting winding for said main generator, a metadyne dynamo-electric machine arranged as an exciter to energize said generator field exciting winding, means including a field exciting winding on said metadyne energized in accordance with a difference of electrical potential between a constant potential and an electrical potential dependent upon the speed of said prime mover for maintaining the speed thereof substantially constant, a second field exciting winding on said metadyne exciter arranged to provide a component of excitation thereto in opposition to said first-mentioned field exciting winding, means for energizing said second metadyne field exciting winding by a substantially constant potential source of electrical power supply, a third field exciting winding on said metadyne exciter arranged to provide a component of excitation thereto in the same direction as said first-mentioned field exciting winding, and means for energizing said third metadyne field exciting winding dependent upon an electrical characteristic of said main generator.

18. A power system including a prime mover, a main electric generator driven by said prime mover, an excitation system for said main generator including a field exciting winding, dynamo-electric means arranged to energize said field exciting winding, and means for varying the energization provided by said dynamo-electric means to regulate the power output of said main generator to a substantially constant value within predetermined limits of electrical potential and current and to limit the electrical potential and current of said main generator to predetermined maximum values.

19. A power system including a prime mover, dynamo-electric means for varying the power developed by said prime mover dependent upon the operating speed thereof, a main electric generator driven by said prime mover, an excitation system for said main generator including a field exciting winding and an auxiliary dynamo-electric machine arranged to energize said field exciting winding, means including a second field exciting winding for varying the energization provided by said auxiliary dynamo-electric machine to regulate inherently the power output of said main generator to a substantially constant value within predetermined limits of electrical potential and current, and means for varying the energization provided by said auxiliary dynamo-electric machine to vary inherently the power output of said main generator when the electrical potential or current thereof tends to exceed said predetermined electrical potential or current respectively.

JOSEPH M. PESTARINI.

CERTIFICATE OF CORRECTION.

Patent No. 2,203,544.　　　　　　　　　　　　　　　June 4, 1940.

JOSEPH M. PESTARINI.

It is hereby certified that error appears in the printed specification of the above numbered patent requiring correction as follows: Page 1, second column, line 16, for "characterises" read --characteristics--; page 3, second column, line 36, for the word "current" read --currents--; page 9, first column, line 34, for "prme" read --prime--; line 67, for "contractor" read --contactor--; line 74, for "effects" read --affects--; page 15, second column, line 67, for the word "machine" read --machines--; and that the said Letters Patent should be read with this correction therein that the same may conform to the record of the case in the Patent Office.

Signed and sealed this 6th day of August, A. D. 1940.

(Seal)　　　　　　　　　　　　　　　　　　　　　　Henry Van Arsdale,
　　　　　　　　　　　　　　　　　　　　　　Acting Commissioner of Patents.